United States Patent
Oh et al.

(10) Patent No.: US 12,541,654 B2
(45) Date of Patent: Feb. 3, 2026

(54) TEXT CLASSIFIER FOR ANSWER IDENTIFICATION, BACKGROUND KNOWLEDGE REPRESENTATION GENERATOR AND TRAINING DEVICE THEREFOR, AND COMPUTER PROGRAM

(71) Applicant: National Institute of Information and Communications Technology, Tokyo (JP)

(72) Inventors: Jonghoon Oh, Tokyo (JP); Kentaro Torisawa, Tokyo (JP); Julien Kloetzer, Tokyo (JP); Ryu Iida, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 391 days.

(21) Appl. No.: 18/031,740

(22) PCT Filed: Oct. 13, 2021

(86) PCT No.: PCT/JP2021/037881
§ 371 (c)(1),
(2) Date: Apr. 13, 2023

(87) PCT Pub. No.: WO2022/085533
PCT Pub. Date: Apr. 28, 2022

(65) Prior Publication Data
US 2023/0385558 A1    Nov. 30, 2023

(30) Foreign Application Priority Data
Oct. 20, 2020 (JP) .................. 2020-175841

(51) Int. Cl.
*G06F 40/40* (2020.01)
*G06F 16/3329* (2025.01)
*G06F 16/35* (2019.01)

(52) U.S. Cl.
CPC .......... *G06F 40/40* (2020.01); *G06F 16/3329* (2019.01); *G06F 16/35* (2019.01)

(58) Field of Classification Search
CPC .......... G06F 40/20; G06F 40/30; G06F 40/40; G06F 16/3329; G06F 16/35
See application file for complete search history.

(56) References Cited

U.S. PATENT DOCUMENTS

| | | | |
|---|---|---|---|
| 11,636,269 B2 * | 4/2023 | Chopra | ............. G06F 16/90332 704/9 |
| 2019/0087730 A1 | 3/2019 | Saito | |

(Continued)

FOREIGN PATENT DOCUMENTS

| | | |
|---|---|---|
| JP | 2017-049681 A | 3/2017 |
| JP | 2019-020893 A | 2/2019 |

(Continued)

OTHER PUBLICATIONS

International Search Report for corresponding Application No. PCT/JP2021/037881, mailed Jan. 11, 2022.

(Continued)

*Primary Examiner* — Huyen X Vo
(74) *Attorney, Agent, or Firm* — Renner, Otto, Boisselle & Sklar, LLP

(57) ABSTRACT

A text classifier 90 for answer identification is capable of highly accurate identification of an answer candidate to a question, by effectively using background knowledge related to the question, in order to extract an answer candidate to the question, the text classifier including: a BERT (Bidirectional Encoder Representation from Transformers) receiving a question and an answer candidate as inputs; a knowledge integration transformer receiving the output of BERT as an input; a background knowledge representation generator receiving a question and an answer as inputs and generating a group of background knowledge representation (Continued)

vectors for the question; and a vector converter respectively converting the question and the answer candidate to embedded vectors and inputting the same to the background knowledge representation generator. The knowledge integration transformer receives the group of background knowledge representation vectors as attention and outputs a label indicating whether the answer candidate includes the correct answer to the question.

4 Claims, 10 Drawing Sheets

(56) References Cited

U.S. PATENT DOCUMENTS

| | | | |
|---|---|---|---|
| 2020/0134263 | A1 | 4/2020 | Oh et al. |
| 2021/0056150 | A1* | 2/2021 | Karandish ........... G06F 16/3329 |
| 2021/0200956 | A1* | 7/2021 | Ding ........................ G06F 40/30 |

FOREIGN PATENT DOCUMENTS

| | | |
|---|---|---|
| JP | 2019-056975 A | 4/2019 |
| JP | 2020-004045 A | 1/2020 |
| JP | 2020-506466 A | 2/2020 |
| WO | 2018217948 A1 | 11/2018 |

OTHER PUBLICATIONS

Jacob Devlin, Ming-Wei Chang, Kenton Lee, and Kristina Toutanova. 2018. BERT : Pre-training of Deep Bidirectional Transformers for Language Understanding. CoRR, abs/1810.04805.

Ian J. Goodfellow, Jean Pouget-Abadie, Mehdi Mirza, Bing Xu, David Warde-Farley, Sherjil Ozair, Aaron Courville, and Yoshua Bengio. 2014. Generative adversarial nets. In Proceedings of the 27th International Conference on Neural Information Processing Systems—vol. 2, NIPS'14, pp. 2672-2680, Cambridge, MA, USA. MIT Press.

Rupesh K Srivastava, Klaus Greff, and Jurgen Schmidhuber. 2015. Training very deep networks. In Advances in Neural Information Processing Systems 28, pp. 2377-2385.

Jong-Hoon Oh, Kentaro Torisawa, Chikara Hashimoto, Motoki Sano, Stijn De Saeger, and Kiyonori Ohtake. 2013. Why-question answering using intra- and inter-sentential causal relations. In Proceedings of the 51st Annual Meeting of the Association for Computational Linguistics (vol. 1: Long Papers), pp. 1733-1743.

Kazuma Kadowaki, Ryu Iida, Kentaro Torisawa, Jong-Hoon Oh, and Julien Kloetzer. 2019. Event causality recognition exploiting multiple annotators' judgments and background knowledge. In Proceedings of the 2019 Conference on Empirical Methods in Natural Language Processing and the 9th International Conference on Natural Language Processing (EMNLP-IJCNLP), pp. 5816-5822.

Jong-Hoon Oh, Kazuma Kadowaki, Julien Kloetzer, Ryu Iida, and Kentaro Torisawa. 2019. Open-domain why-question answering with adversarial learning to encode answer texts. In Proceedings of the 57th Annual Meeting of the Association for Computational Linguistics, pp. 4227-4237.

Danqi Chen, Adam Fisch, Jason Weston, and Antoine Bordes. 2017. Reading Wikipedia to answer open-domain questions. In Proceedings of the 55th Annual Meeting of the Association for Computational Linguistics (vol. 1: Long Papers), pp. 1870-1879.

Bhuwan Dhingra, Kathryn Mazaitis, and William W Cohen. 2017. Quasar: Datasets for question answering by search and reading. arXiv preprint arXiv:1707.03904.

Matthew Dunn, Levent Sagun, Mike Higgins, V. Ugur Gueney, Volkan Cirik, and Kyunghyun Cho. 2017. Searchqa: A new q & a dataset augmented with context from a search engine. CoRR, abs/1704.05179.

Mandar Joshi, Eunsol Choi, Daniel Weld, and Luke Zettlemoyer. 2017. Triviaqa: A large scale distantly supervised challenge dataset for reading comprehension. In Proceedings of the 55th Annual Meeting of the Association for Computational Linguistics, pp. 1601-1611.

Yankai Lin, Haozhe Ji, Zhiyuan Liu, and Maosong Sun. 2018. Denoising distantly supervised open-domain question answering. In Proceedings of the 56th Annual Meeting of the Association for Computational Linguistics, ACL 2018, pp. 1736-1745.

Zhiguo Wang, Patrick Ng, Xiaofei Ma, Ramesh Nallapati, and Bing Xiang. 2019. Multi-passage BERT: A globally normalized BERT model for open-domain question answering. In Proceedings of the 2019 Conference on Empirical Methods in Natural Language Processing and the 9th International Joint Conference on Natural Language Processing (EMNLP-IJCNLP), pp. 5878-5882. Association for Computational Linguistics.

Pranav Rajpurkar, Jian Zhang, Konstantin Lopyrev, and Percy Liang. 2016. Squad: 100,000+ questions for machine comprehension of text. In Proceedings of the 2016 Conference on Empirical Methods in Natural Language Processing, pp. 2383-2392.

Makoto Nakatsuji, Sohei Okui, and Akihisa Fujita : Neural Answer Construction Model for Non-Factoid Questions. The journal of IEICE, Apr. 1, 2019, vol. J102-D, No. 4, pp. 267-276 (with English Abstract).

Wenhan Xiong, Jingfei Du, William Yang Wang, and Veselin Stoyanov, Pretrained Encyclopedia: Weakly Supervised Knowledge-Pretrained Language Model. Published as a conference paper at ICLR 2020.

Kelvin Guu, Kenton Lee, Zora Tung, Panupong Pasupat, and Ming-Wei Chang, REALM: Retrieval-Augmented Language Model Pre-Training. Cite as:arXiv:2002.08909 [cs.CL].

An Yang1, Quan Wang, Jing Liu, Kai Liu, Yajuan Lyu, Hua Wu, Qiaoqiao She, and Sujian Li, "Enhancing Pre-Trained Language Representations with Rich Knowledge for Machine Reading Comprehension", Proceedings of the 57th Annual Meeting of the Association for Computational Linguistics, pp. 2346-2357, Florence, Italy, Jul. 28-Aug. 2, 2019.

Weijie Liu, Peng Zhou, Zhe Zhao, Zhiruo Wang, Qi Ju, Haotang Deng and Ping Wang, "K-BERT: Enabling Language Representation with Knowledge Graph," arXiv:1909.07606v1 [cs.CL] Sep. 17, 2019.

* cited by examiner

Fig. 1

| QUESTION | How can we avoid catching the flu? |
|---|---|
| ANSWER PASSAGE (POSITIVE EXAMPLE) | ... As the flu season approaches, it's important to marshal all our defenses against influenza. You can catch the flu from people who cough, sneeze, or even just talk around you. The best way to prevent seasonal flu is to get vaccinated every year. Also good health habits like wearing face masks and washing your hands often can help stop the spread of germs. There also are flu antiviral drugs that can be used to treat and prevent flu. ... |

Fig. 2

BACKGROUND KNOWLEDGE
- When going to a crowded place, you had better wear face masks[tool] and avoid influenza infection[goal]
- Get the influenza vaccine, wash your hands regularly[tool], and protect your family from the flu[goal]

Fig. 3

| QUESTION | How can we avoid catching the flu? |
|---|---|
| ANSWER PASSAGE (POSITIVE EXAMPLE) | ... As the flu season approaches, it's important to marshal all our defenses against influenza. You can catch the flu from people who cough, sneeze, or even just talk around you. The best way to prevent seasonal flu is to get vaccinated every year. Also good health habits like wearing face masks and washing your hands often can help stop the spread of germs. There also are flu antiviral drugs that can be used to treat and prevent flu. ... |

BACKGROUND KNOWLEDGE
- When going to a crowded place, you had better wear face masks[tool] and avoid influenza infection[goal]
- Get the influenza vaccine, wash your hands regularly[tool], and protect your family from the flu[goal]

|  | Quasar-T | | SearchQA | | TriviaQA | | |
| --- | --- | --- | --- | --- | --- | --- | --- |
|  | EM | F1 | EM | F1 | EM | F1 | |
| OpenQA | 42.2 | 49.3 | 58.8 | 64.5 | 48.7 | 56.3 | }800 |
| OpenQA+ARG | 43.2 | 49.7 | 59.6 | 65.3 | 49.6 | 54.8 | }802 |
| MBERT | 51.1 | 59.1 | 65.1 | 70.7 | 63.7 | 69.2 | }804 |
| Proposed | 55.7 | 63.2 | 72.1 | 77.2 | 66.6 | 71.9 | }806 |
| w/o BKRG | 52.7 | 59.8 | 69.1 | 74.3 | 64.6 | 70.3 | }808 |
| w/o update | 54.0 | 61.3 | 70.8 | 76.0 | 66 | 71.3 | }810 |
| Multi-task | 48.2 | 55.5 | 69.8 | 75.2 | 65.1 | 70.3 | }812 |

Fig. 15

| WHY-QUESTION ANSWERING DATA | | |
|---|---|---|
| | QUESTIONS | PASSAGES |
| TRAINING | 850 | 17,000 |
| DEVELOPMENT | 100 | 2,000 |
| EVALUATION | 500 | 10,000 |
| SUM | 1,450 | 29,000 |

Fig. 16

| HOW-TO-QUESTION ANSWERING DATA | | |
|---|---|---|
| | QUESTIONS | PASSAGES |
| TRAINING | 1,000 | 20,000 |
| DEVELOPMENT | 200 | 4,000 |
| EVALUATION | 1,200 | 24,000 |
| SUM | 2,400 | 48,000 |

Fig. 17

| METHODS | WHY-TYPE P@1 | WHY-TYPE MAP | HOW-TO-TYPE P@1 | HOW-TO-TYPE MAP | |
|---|---|---|---|---|---|
| CNN+ARG (OH19) | 51.4 | 49.2 | 48.5 | 48.2 | }630 |
| BERT | 63.8 | 61.4 | 55.1 | 55.2 | }632 |
| BERT+BKRG | 64.2 | 61.9 | 56.0 | 55.4 | }634 |
| Proposed | 68.0 | 62.5 | 58.8 | 56.6 | }636 |
| w/o update | 67.0 | 62.3 | 57.6 | 56.1 | }638 |
| w/o $F_c$ | 67.0 | 62.4 | 57.7 | 55.9 | }640 |
| w/o $F_t$ | 66.8 | 62.0 | 57.3 | 56.5 | }642 |

|  | NUMBER OF QUESTIONS | | |
|---|---|---|---|
|  | Train | Dev | Test |
| Quasar-T | 37,012 | 3,000 | 3,000 |
| SearchQA | 99,811 | 13,893 | 27,247 |
| TriviaQA | 87,291 | 11,274 | NA |

TEXT CLASSIFIER FOR ANSWER IDENTIFICATION, BACKGROUND KNOWLEDGE REPRESENTATION GENERATOR AND TRAINING DEVICE THEREFOR, AND COMPUTER PROGRAM

TECHNICAL FIELD

The present invention relates to a question-answering system and, more specifically, in a question-answering system that extracts passages possibly including answers from a text archive in response to a question input in a natural language to identify an answer, a text classifier for classifying the passages to those including and those not including correct answers, a background knowledge representation generator used in the text classifier for answer identification, a training device therefor, and a computer program for training the background knowledge representation generator. The present invention claims convention priority on Japanese Patent Application No. 2020-175841 filed on Oct. 20, 2020, and incorporates the entire description of this Japanese application by reference.

BACKGROUND ART

A why-question-answering system using natural language processing is disclosed in Patent Literature 1 as listed below. Different from a factoid question-answering system, in a why-type question-answering system, it is typical to extract a plurality of passages consisting of a set of sentences (hereinafter referred to as a passage group; each passage includes five to seven sentences) having high possibility of being an answer from a text archive and to select the one most appropriate as an answer among them. Here, a passage refers to a plurality of continuous sentences in text. The why-type question-answering system described in Patent Document 1 is of this type, and as a premise, it utilizes an answer candidate retrieval system that extracts, upon receiving a question, a plurality of passages having high possibility of including a correct answer to the question from a text archive and outputs them.

The system described in Patent Document 1 collects a large amount of text on the Web beforehand. Representations possibly representing causal relations are extracted from the web archive. The system disclosed in Patent Literature 1 adopts such a mechanism that recognizes a causal relation in answer passages by using a clue term such as "because" or causal relation patterns such as "A causes B."

The why-question answering system described in Patent Document 1 extracts features for determining whether or not a passage is apt as an answer to a question, from each of the answer passages, the extracted knowledge on causal relations, and the question. Then, an answer passage and the extracted features are input to a pre-trained Convolutional Neural Network (hereinafter denoted as CNN). CNN outputs a likelihood that the answer passage is apt as an answer to the question (probability that the question is likely to be a question eliciting the answer passage) as a score. The why-type question-answer system ranks answer passages in accordance with the scores calculated for respective answer passages and outputs that answer passage which has the highest score as an answer to the question.

CITATION LIST

Patent Literature

PTL 1: JP 2017-049681 A
PTL 2: JP 2020-506466 A

SUMMARY OF INVENTION

Technical Problem

For a why-type question, an apt answer may be a cause part of a causal relation representation having the question in its effect part. According to Patent Literature 1, a passage most appropriate as an answer can be extracted from the group of answer candidate passages based on the causal relation representations. Therefore, according to Patent Literature 1, it is possible to select a more apt answer to a why-type question as compared with the conventional examples.

However, it is still difficult to correctly determine whether each passage is an answer to the question with high probability in the invention disclosed in Patent Literature 1 as well as in various approaches. When a human being extracts an answer to a question from passages extracted in the same manner in question-answering, he/she can correctly determine whether the passage includes a correct answer and extracts a portion that serves as the correct answer, utilizing his/her background knowledge. If such background knowledge can be efficiently utilized in a question-answering system using natural language processing, the question-answering system would provide an answer to a question with higher accuracy.

Conventionally, such background knowledge has been considered to be passages simply regarded as highly relevant to a question and it has been questionable if the background knowledge was effectively utilized when an answer was actually specified. In order to improve answer accuracy of a question-answering system, it is desirable to enable determination of whether a passage includes a correct answer with high accuracy and to enable accurate specification of that portion which is considered to be particularly relevant to the question, by using the background knowledge. For this purpose, further consideration should be given to how to represent the background knowledge and how to use it for identifying an answer.

Therefore, an object of the present invention is to provide, a text classifier for answer identification that can identify an answer candidate to a question with high accuracy by effectively utilizing the background knowledge in extracting an answer candidate to a question, a background knowledge representation generator therefor, a training device therefor, and a computer program.

Solution to Problem

According to a first aspect, the present invention provides a text classifier for answer identification, including: a language representation model receiving as inputs question text and answer candidate text; a knowledge integration transformer receiving, as an input, an output of the language representation model; and a background knowledge representation generator receiving the question text and the answer candidate text as inputs, and outputting a background knowledge representation vector for the question text; wherein the knowledge integration transformer is configured to receive the background knowledge representation vector as an attention, and outputs a label indicating whether or not the answer candidate text includes an answer to the question text.

Preferably, the knowledge integration transformer includes a plurality of knowledge integration transformer layers; the background knowledge representation generator outputs a plurality of background knowledge representation vectors corresponding to the plurality of knowledge integration transformer layers; and the plurality of knowledge integration transformer layers receive, as information source for the attention, that one of the plurality of background knowledge representation vectors which corresponds to each knowledge integration transformer layer.

More preferably, the background knowledge representation generator includes a background knowledge representation generator layer outputting the background knowledge representation vector in response to an input vector representing a question and an answer candidate, and an updating unit updating the input vector to the background knowledge representation generator layer, by using the background knowledge representation vector output by the background knowledge representation generator layer, to be used as the next input vector to the background knowledge representation generator layer; and the updating unit updates a preceding input vector to the background knowledge representation generator by utilizing relevance between the preceding input vector and the background knowledge representation vector output by the background knowledge representation generator in response to the preceding input vector.

According to a second aspect, the computer program causes a computer to function as any of the above-described text classifier for answer identification.

According to a third aspect, the present invention provides a training device for training a background knowledge representation generator outputting a background knowledge vector representation for a question represented by question text by using a plurality of training data items, the plurality of training data items including question text and background knowledge text related to the question text; the training device including: a real representation generator formed of a neural network generating, upon reception of the question text and the background knowledge text, a real representation vector in the same form as background knowledge vector representation represented by the background knowledge text; a fake representation generator formed of a neural network generating, upon reception of the question text and random noise vector representing vector representation of arbitrary text, a fake representation vector in the same form as the vector representation related to the background knowledge generated from the noise vector; a discriminator formed of a neural network for discriminating the real representation vector and the fake representation vector; and a Generative Adversarial Network training the real representation generator and the discriminator such that discrimination error by the discriminator is minimized and training the fake representation generator such that discrimination error by the discriminator for the fake representation is maximized, all through adversarial training; wherein the fake representation generator after completion of training by the Generative Adversarial Network training is the background knowledge representation generator after training, and an output of the fake representation generator upon reception of an actual question text and arbitrary text as inputs is a background knowledge representation vector for the actual question text and the arbitrary text, According to a fourth aspect, the computer program causes a computer to function as the above-described training device.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 1 shows an example of an answer passage used in a question-answering system.

FIG. 2 shows examples of background knowledge.

FIG. 3 shows relations between the background knowledge and the answer passage.

FIG. 15 shows, in the form of a table, statistics related to why-type question-answering data.

FIG. 16 shows, in the form of a table, statistics related to how-type question-answering data.

FIG. 17 shows, in the form of a table, experimental results showing effects of the text classifier for answer identification in accordance with the first embodiment.

DESCRIPTION OF EMBODIMENTS

Figure 4:
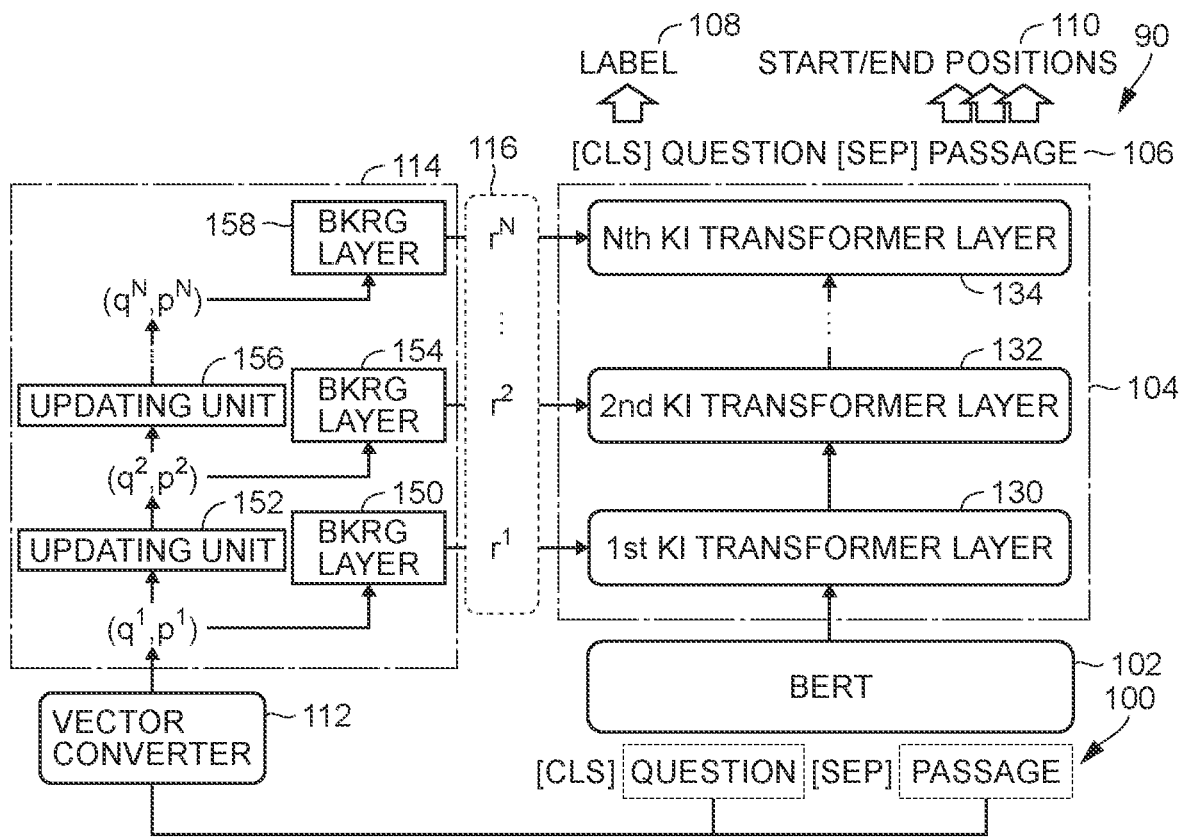
FIG. 4 is a block diagram schematically showing a text classifier for answer identification in accordance with a first embodiment of the present invention.

In the following description and in the drawings, the same components are denoted by the same reference characters. Therefore, detailed description thereof will not be repeated.

First Embodiment (Answer Passage and Background Knowledge)

FIG. 1 shows examples of a question 50 and an answer passage 52. Referring to FIG. 1, to a question 50, answer passage has portions apt as answers such as "The best way to prevent seasonal flu is to get vaccinated every year." and "good health habits like wearing face masks and washing your hands often can help stop the spread of germs." A human being, having advance background knowledge, can easily recognize that these portions are descriptions apt as answers to question 50. It is quite challenging to have a computer to fulfill such a task based on background knowledge.

(Background Knowledge Representation Generator)

For a why-type question, causal relation could serve as the background knowledge. In addition to the why-type question, we have a question different in type from factoid question; that is, a how-type question. For a how-type question, tool-goal relation could serve as the background knowledge. Therefore, in the following embodiment, semantic relation such as the causal relation and tool-goal relation are used as training data for training a background knowledge representation generator. The causal relation and the tool-goal relation will be important background knowledge for providing an answer to a why-type question and to a how-type question, respectively. By training a background knowledge representation generator using such semantic relations, it becomes possible, when a question is given, to identify that portion in an answer passage which is relevant to the question, and therefore, it becomes possible to classify with high accuracy passages that include and do not include a correct answer to the question.

For training the background knowledge representation generator, it is necessary to collect a large amount of background knowledge of causal relation and tool-goal relation. This may be done manually. It is practical, however, to collect a huge amount of background knowledge automatically from the Web, in order to train the background knowledge representation generator through machine learning. The method thereof will be described later.

FIG. 2 shows two sentences both representing the tool-goal relation extracted from separate Web documents, as examples of background knowledge 60. Such sentences representing the tool-goal relation and sentences representing the causal relation are prepared in large number. The background knowledge representation generator is trained using these sentences, so that when a why-type question or a how-type question is input to a question-answering system, the question-answering system can easily find a passage including an answer and its portion to be noticed.

FIG. 3 shows the concept. Referring to FIG. 3, for a given question 50 and an answer passage 52, when question 50 is applied to a background knowledge representation generator, a background knowledge representation vector representing in some manner the background knowledge for the question 50 is obtained. By judging the magnitude of relation between the background knowledge representation vector and each wording in answer passage 52, wordings worth noting in answer passage 52 are identified as indicated by arrows 70, 72 and 74, which serve as hints to find an answer. This facilitates identification of an answer. For this purpose, however, we must address the problem of how best to obtain the background knowledge representation vector. The scheme for this purpose will be described in the following.

Overall Configuration

FIG. 4 is a block diagram showing a configuration of a text classifier 90 for answer identification in accordance with a first embodiment. Referring to FIG. 4, text classifier 90 for answer identification includes a language representation model BERT (Bidirectional Encoder Representation from Transformers) 102, which is a language representation model provided to receive an input 100 obtained by concatenating a question and a passage paired with the question. BERT 102 is a language representation model described in Reference 1 listed below, and it is well known to be easily pre-trained and to have high performance. Configuration of BERT 102 will be described later.

An input to BERT 102 consists of a class token [CLS] indicating class classification positioned at the head, a word sequence indicating a question, followed by a separation token [SEP], and a word sequence indicating a passage, positioned following the separation token. The length of input 100 depends on the input sentence. Therefore, in this embodiment, the length of input 100 is fixed to 512 and a prescribed letter sequence is input to fill any gap.

Text classifier 90 for answer identification further includes: a vector converter 112 receiving input 100 in parallel with BERT 102, for converting each word in the question and in the passage of input 100 to a trained word-embedding vector and outputting the same; a BKRG 114 including a plurality of BKRG layers, receiving a word-embedded vector sequence q of question text and a word-embedded vector sequence p of passage text converted by vector converter 112, and outputting, from each layer, a vector group 116 of background knowledge representations related to the question; and a KI transformer 104, provided following the output of BERT 102, including a plurality of KI (Knowledge Integration) transformer layers, same in number as BKRG 114, for performing language processing on the output of BERT 102 using vector group 116 of background knowledge representations as attention, for eventually outputting a label 108 indicating whether or not a passage of input 100 includes an answer to the question as well as an output 106 including a start/end position 110 of a portion serving as the answer in the passage. The KI transformer layer is based on the encoder block of the language model referred to as a transformer in Patent Literature 2, which is remodeled as described later with reference to FIG. 11, to extract an answer based on the background knowledge.

BKRG 114

In the example of FIG. 4, BKRG 114 includes N BKRG layers 150, 154, ..., 158; and N-1 updating units 152, 156, and so forth, provided corresponding to each of the N BKRG layers 150 and so forth except for the uppermost BKRG layer 158, for updating an input to the corresponding BKRG layer 150, and so forth, and applying the result to the next BKRG layer 154. To the updating unit 152 of the first layer, a word-embedding vector sequence ($q^1$, $p^1$) of the question and the passage output from vector converter 112 is input. Updating unit 152 performs a prescribed updating process on this vector sequence ($q^1$, $p^1$) and outputs an updated vector sequence ($q^2$, $p^2$). Through similar processing, a vector sequence ($q^N$, $p^N$) is applied to the BKRG layer 158 of the last stage. Outputs from BKRG layers 150, 154, . . . , 158 are vectors $r^1$, $r^2$, . . . , $r^N$ forming the vector group 116 of background knowledge representations. As will be described later, BKRG layers 150, 154, . . . , 158 are trained in advance. Text classifier for answer identification is also trained in general, while at that time, parameters of BKRG layers 150, 154, . . . , 158 are the same with each other and fixed. Therefore, BKRG layers 154, . . . , 158 may be formed by copying the trained BKRG layer 150, or BKRG layer 150 may be used repetitively as BKRG layers 154, . . . , 158.

The vector group 116 of background knowledge representations output from BKRG layers 150, 154, . . . , 158 include vectors $r^1$, $r^2$, . . . , $r^N$ output from these BKRG layers.

KI Transformer 104

KI transformer 104 includes, as does BKRG 114, N KI transformer layers 130, 132, . . . , 134. Specifically, KI transformer 104 includes: a KI transformer layer 130 receiving an output of BERT 102 and vector $r^1$ from BKRG layer 150 of the same layer in BKRG 114; a KI transformer layer 132 receiving an output from KI transformer layer 130 and vector $r^2$ from BKRG layer 154; and one or more KI transformer layers, not shown, receiving in the similar manner as described above, an output of the KI transformer layer of the immediately lower KI transformer layer and a vector r from the BKRG layer of the same layer in BKRG 114. The uppermost, N-th KI transformer layer is KI transformer layer 134 that receives the output from the lower, N-1-th KI transformer layer (not shown) and a vector r N output from the N-th BKRG layer 158 and provides output 106.

In the following, components of text classifier 90 for answer identification will be described.

BKRG

BKRG layers 150, 154, . . . , 158 all have the same configuration and the same parameters. Actually, after training BKRG layer 150, BKRG layers 154, . . . , 158 may be prepared by copying BKRG layer 150 or may be calculated using BKRG layer 150 repeatedly. Therefore, the structure and the method of training BKRG layer 150 only will be described in the following. Considering that it serves to provide an input to KI transformer layer 130, the background knowledge should desirably have some form of a vector. Here, we have few clues to specify what is to be represented as the background knowledge and how to represent it as a vector.

Here, as a technique possibly enabling formation of background knowledge representation in vector form through automatic processing by a computer, Reference 2 describes a machine learning technique known as Generative Adversarial Network (GAN). GAN is often applied for generating an image, allowing generation of a fake image (counterfeit) so elaborate that it is almost indistinguishable from a photo. It might be powerful enough to generate background knowledge in the question-answering process as discussed in the present embodiment. Here, we use GAN to train BKRG layer 150 of the present embodiment.

<<Training of BKRG Layer 150>>

Figure 5:
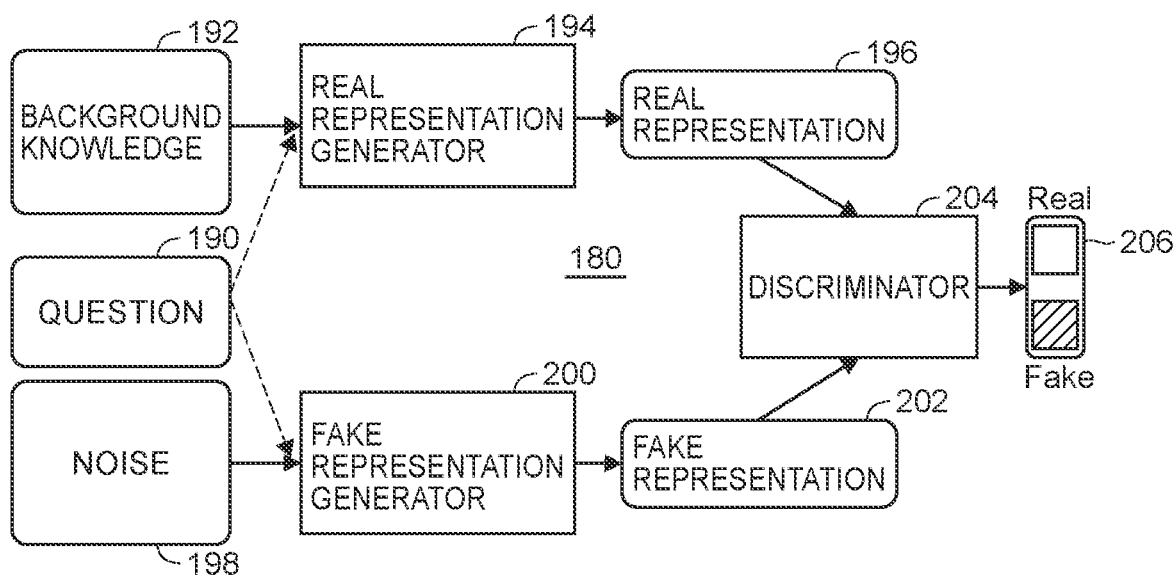
FIG. 5 is a schematic illustration of configuration of a system for obtaining Background Knowledge Representation Generator (BKRG) by adversarially training a fake representation generator for forming a background knowledge representation vector from a question.

FIG. 5 shows a basic configuration for training BKRG layer 150 using GAN. Referring to FIG. 5, a GAN 180 includes: a real representation generator 194 generating a vector representation referred to as real representation 196, from a question 190 and background knowledge 192, using training data items each including question 190 and background knowledge 192 related to the question, prepared in advance; a fake representation generator 200 sampling noise 198 representing arbitrary text, and generating fake representation, denoted as fake representation 202, from the sampled noise; and a discriminator 204 responsive to receipt of real representation 196 or fake representation 202 at an input, for determining whether it is real or fake, and for outputting the result 206 of discrimination. Real representation generator 194, fake representation generator 200 and discriminator 204 are all neural networks.

Figure 6:
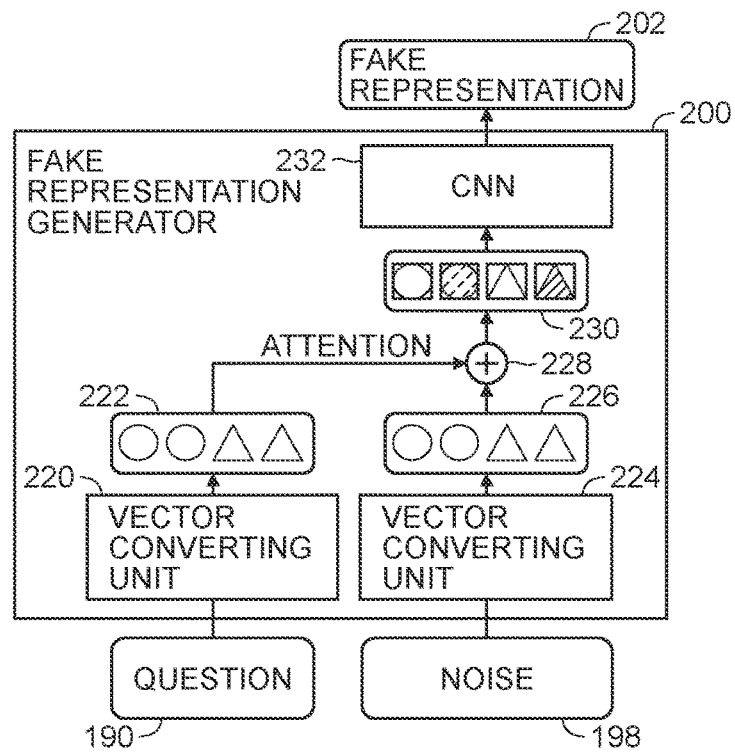
FIG. 6 is a block diagram showing a basic configuration of an encoder forming the fake representation generator shown in FIG. 5.

Real representation generator 194 and fake representation generator 200 both have the same structure of an encoder. Therefore, only the structure of fake representation generator 200 will be described in the following. Referring to FIG. 6, fake representation generator 200 includes: a word-embedding vector converting unit 224 receiving noise 198 and converting it to noise word-embedding vector sequence 226; and a word-embedding vector converting unit 220 receiving question 190, converting each word in question 190 to a word vector and outputting a question word-embedding vector sequence 222.

Fake representation generator 200 further includes: an attention adding unit 228 for adding, to each vector of noise word-embedding vector sequence 226, an attention from question word-embedding vector sequence 222, and outputting an attention-modified word-embedding vector sequence 230; and a CNN 232 having an input for receiving attention-modified word-embedding vector sequence 230 and trained to output a fake representation 202 as a vector representation of question 190.

Real representation generator 194 shown in FIG. 5 also has the structure identical to fake representation generator 200 including CNN 232. The real representation generator 194 differs from fake representation generator 200 in that the object of encoding is not the noise 198 but the background knowledge 192.

Discriminator 204 shown in FIG. 5 is a feed-forward network having a logistic regression layer as the final layer, of which activation function is sigmoid function. Either real representation 196 or fake representation 202 is input to discriminator 204. Discriminator 204 has two outputs, and it is trained such that when the input is determined to be real representation 196, one output assumes true and the other false, and when the input is determined to be fake representation 202, one assumes false and the other true.

These three networks are trained by generative adversarial network (GAN) learning. Specifically, real representation generator 194 and discriminator 204 are trained such that real representation 196 can be distinguished from fake representation 202 (to minimize discrimination error), and fake representation generator 200 is trained such that fake representation 202 cannot be distinguished from real representation 196 (to maximize discrimination error of discriminator 204 for fake representation 202). Namely, these three networks are trained in accordance with the equation below.

$$\min_{F} \max_{D,R} V(D, F, R) = \qquad \text{[Equation 1]}$$
$$\mathbb{E}_{b \sim d_b(b)}[\log D(R(b; q))] + \mathbb{E}_{z \sim d_z(z)}[\log(1 - D(F(z; q)))]$$

where b represents background knowledge, q represents question, z noise, D discriminator 204, F fake representation generator 200, R real representation generator 194, R(b;q) represents an output of real representation generator 194 (real representation 196) when background knowledge b and question q are given, F(z;q) represents an output of fake representation generator 200 (fake representation 202) when noise z and question q are given, $d_b$ represents distribution followed by background knowledge b, $d_z$ represents distribution followed by noise z, and E represents expected value.

At the time point when the determination of discriminator 204 eventually attains 50%, or when a designated time of repetition ends, training of fake representation generator 200 ends. This is based on the game theory, and the probability of the correct discrimination by discriminator 204 eventually attains to 50% as it reaches a Nash equilibrium. If fake representation 202 is generated from question 190 and the noise by using fake representation generator 200 trained in this manner, the fake representation 202 would be indistinguishable from real representation 196 generated by real representation generator 194 from question 190 and background knowledge 192.

Specifically, assuming that a question and arbitrary text are given to fake representation generator 200, the output from fake representation generator 200 will be such a representation that could be generated when both a question and its background knowledge are given together to fake representation generator 200. The output no longer deserves to be called fake representation and hence, in the following, it will be referred to as a background knowledge representation vector. Further, the trained fake representation generator 200 will be referred to as background knowledge representation generator (BKRG). The number of elements of background knowledge representation vector is determined beforehand to be the maximum number of elements of the vectors obtained from the training data.

As will be described later, determination as to whether a passage provides a correct answer to a question using the background knowledge representation generator was found to attain clearly higher accuracy as compared with the conventional examples.

Training by GAN 180 is realized by computer hardware and computer programs (hereinafter referred to as "programs") executed on the computer hardware. For the training, it is necessary to prepare training data. The present embodiment provides a question-answering system capable of answering to both why-type and how-type questions. For this purpose, two BKRGs, that is, causal relation BKRG and tool-goal relation BKRG have to be prepared. In the present embodiment, outputs of these two are concatenated to be used as an output of one BKRG.

Figure 7:
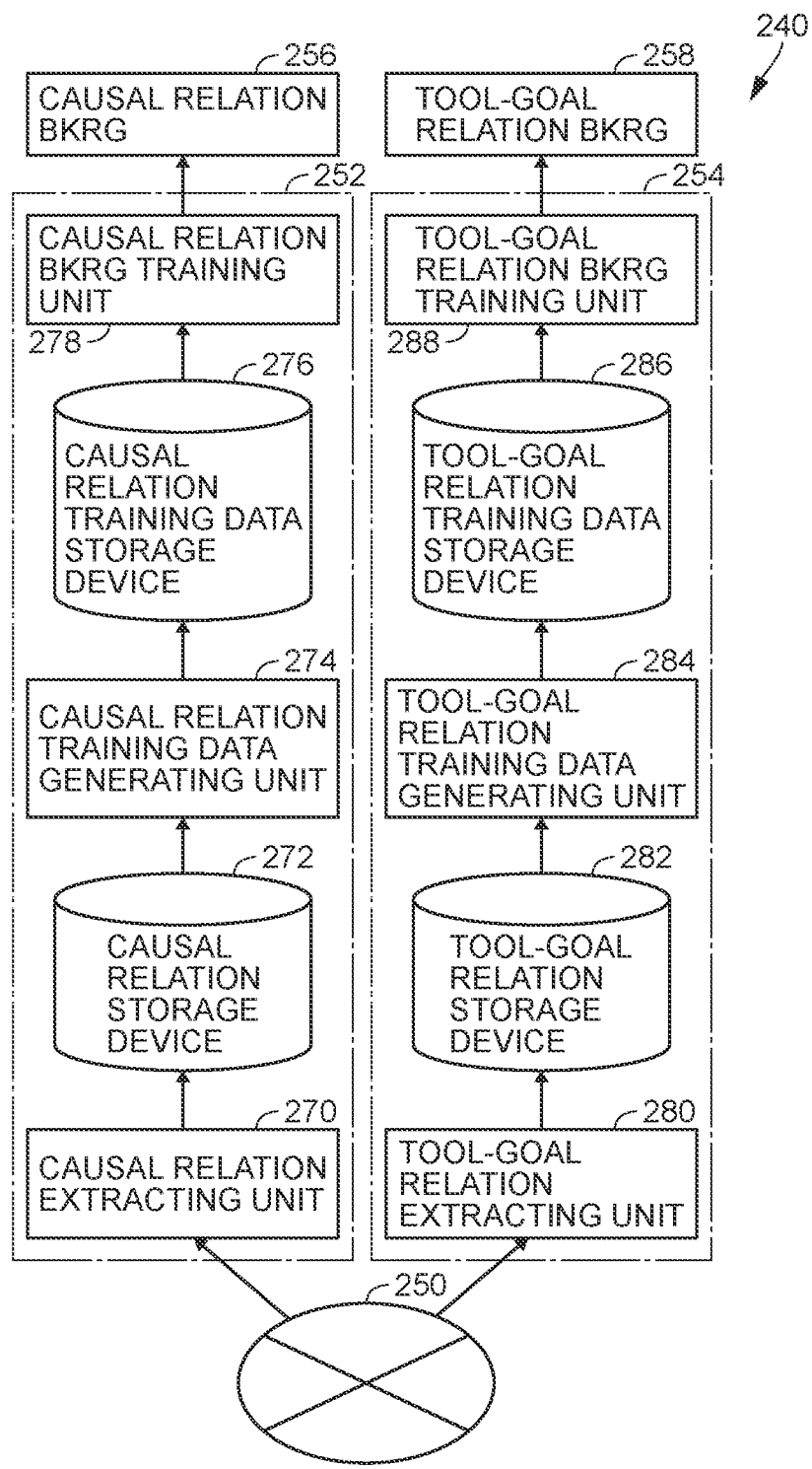
FIG. 7 is a block diagram schematically showing a configuration of a BKRG training system for generating a causal relation BKRG and tool-goal relation BKRG by training the fake representation generator shown in FIG. 5.

In order to train causal relation BKRG, it is necessary to collect causal relations, and in order to train tool-goal relation BKRG, it is necessary to collect tool-goal relations. FIG. 7 shows a schematic configuration of a training system for collecting training data and to train BKRGs.

Referring to FIG. 7, a BKRG training system 240 includes: a causal relation BKRG training unit 252 collecting a huge amount of text representing causal relation from the Internet 250, and by using these, training causal relation BKRG 256; and a tool-goal relation BKRG training unit 254 colleting a huge amount of text representing tool-goal relations from the Internet 250 and by using these, training tool-goal relation BKRG 258.

Causal relation BKRG training unit 252 includes: a causal relation extracting unit 270 for extracting text representing causal relation from the Internet 250; a causal relation storage device 272 for storing text extracted by causal relation extracting unit 270; a causal relation training data generating unit 274 for extracting and combining a question part and a background part from each causal relation stored in causal relation storage device 272 and thereby generating training data for causal relation BKRG 256; a causal relation training data storage device 276 for storing the training data generated in the above-described manner; and a causal relation BKRG training unit 278 for training causal relation BKRG 256 by GAN by using the training data obtained from the causal relation stored in causal relation training data storage device 276.

Causal relation training data generating unit 274 generates the training data from the causal relation in the following manner. Causal relation consists of a cause part and an effect part representing the result. The effect part is used as a question part and the cause part is used as the background part. By way of example, consider causal relation such as "because most of the population do not have any antibody against a new strain of influenza (cause part), global pandemic and accompanying social impact may possibly occur (effect part)." Here, a question derived from the effect part "why do global pandemic and accompanying social impact occur" will be the question part and the cause part "because most of the population do not have any antibody against a new strain of influenza" will be the background knowledge.

Tool-goal relation BKRG training unit 254 includes: a tool-goal relation extracting unit 280 for extracting text representing tool-goal relation from the Internet 250; a tool-goal relation storage device 282 for storing text extracted by tool-goal relation extracting unit 280; a tool-goal relation training data generating unit 284 for extracting and combining a question part and a background part from each relation stored in tool-goal relation storage device 282 and thereby generating training data for tool-goal relation BKRG 258; a tool-goal relation training data storage device 286 for storing the training data generated in the above-described manner; and a tool-goal relation BKRG training unit 288 for training tool-goal relation BKRG 258 by GAN using the training data obtained from the tool-goal relations stored in tool-goal relation training data storage device 286.

Tool-goal relation training data generating unit 284 generates the training data from the tool-goal relations in the following manner. A tool-goal relation consists of a tool part and a goal part. The goal part will be the question part and the tool part will be the background knowledge part. For example, let us consider "when you go into the crowd, you have to wear face masks (tool part) to prevent flu infection (goal part)." Here, a query "How to avoid the flu when you go into crowd?" obtained from the goal part will be the question part, and "wear face masks" of the tool part will be the background knowledge part.

In the present embodiment, causal relation BKRG 256 and tool-goal relation BKRG 258 are trained separately as described above. At the time of testing, same question is given to causal relation BKRG 256 and tool-goal relation BKRG 258, and vectors obtained therefrom are concatenated to be a background knowledge representation vector.

Specifically, causal relation BKRG 256 and tool-goal relation BKRG 258 are juxtaposed to operate as one BKRG.

Figure 8:
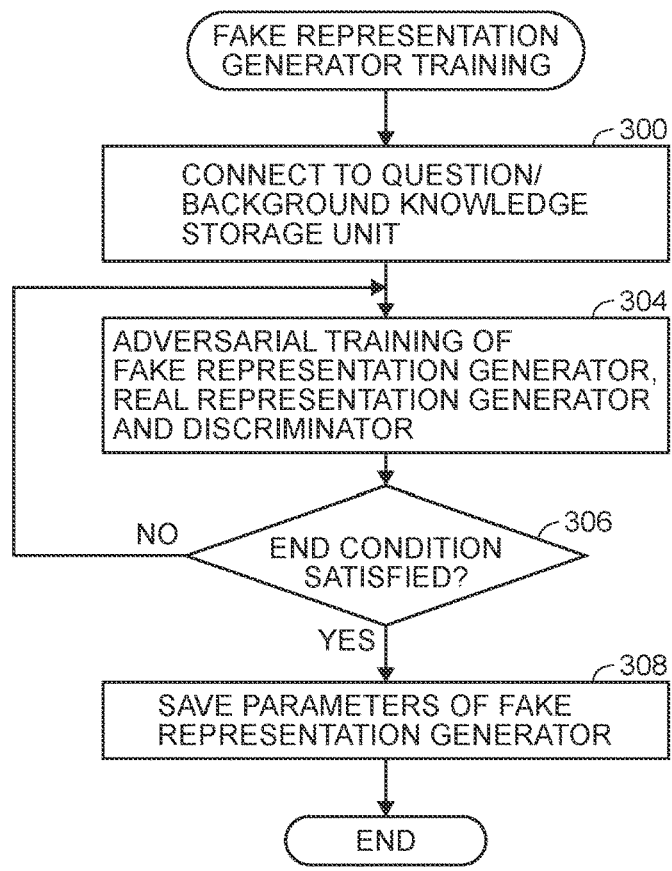
FIG. 8 is a flowchart showing a control structure of a main routine of a program realizing adversarial training by the system shown in FIG. 5.

FIG. 8 is a flowchart showing a control structure of a program realizing the training by GAN 180. The causal relation BKRG 256 and the tool-goal relation BKRG 258 shown in FIG. 7 can be trained separately. Here, a program realizing training of causal relation BKRG 256 will be described, and it is noted that the similar program can be used for training tool-goal relation BKRG 258.

Referring to FIG. 8, the program includes: a step 300 of connecting a computer to causal relation training data storage device 276 shown in FIG. 7 to enable communication; a step 304 of training fake representation generator 200, real representation generator 194 and discriminator 204 shown in FIG. 5 by GAN between real representation generator 194 and discriminator 204 as well as fake representation generator 200; a step 306 of determining whether or not end condition for training is satisfied as a result of step 304 and branching control flow depending on the result of determination; and a step 308, executed in response to the determination at step 306 that the end condition is satisfied, of storing parameters of fake representation generator 200 in a prescribed storage device and ending execution of this program. If the determination at step 306 is in the negative, the control flow returns to step 304. Therefore, until the end condition is satisfied, step 304 is repeated. Step 308 may allow the user to designate file name and storage address of the parameters.

Figures 9, 20:
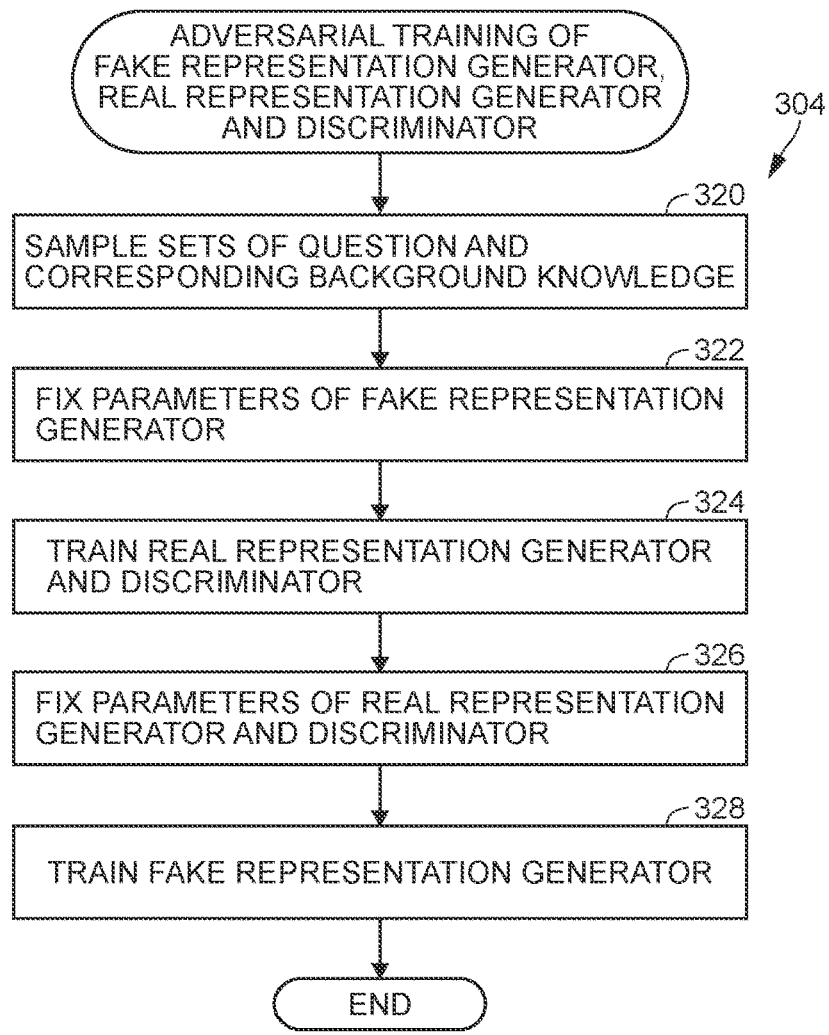
FIG. 9 is a flowchart showing a control structure of a routine for training parameters of fake representation generator in the program shown in FIG. 8.
FIG. 20 shows, in the form of a table, experimental results showing effects of the question-answering system in accordance with the second embodiment.

Referring to FIG. 9, the program for realizing the adversarial training at step 304 of FIG. 8 includes: a step 320 of sampling, from training data, a plurality of samples each consisting of a combination of a question and background knowledge corresponding to the question; a step 322 of fixing parameters of fake representation generator 200; a step 324 of training real expression generator 194 and discriminator 204, using the questions and background knowledge of the samples sampled at step 320, to minimize the possibility of discriminator 204 erroneously discriminating the real representation 196 generated by real representation generator 194 to be fake and the fake representation 202 generated by fake representation generator 200 to be real; a step 326, following step 324, of fixing parameters of discriminator 204 and real representation generator 194; and a step 328 of generating fake representations 202 from question 190 and the noise by fake representation generator 200, and training parameters of fake representation generator 200 to maximize the possibility of discriminator 204 erroneously discriminating these fake representations 202 to be real representations.

<<BERT 102>>

Figure 10:
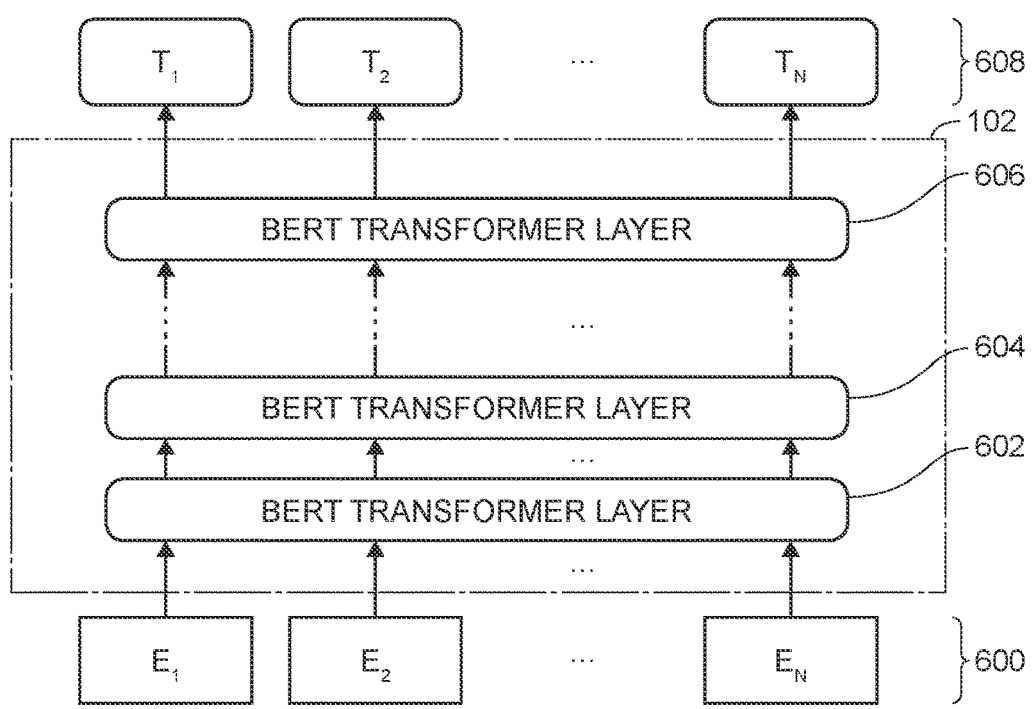
FIG. 10 is a block diagram schematically showing a configuration of BERT shown in FIG. 4.

FIG. 10 schematically shows a configuration of BERT 102. BERT is known as a language representation model that allows easy pre-training, allows translation with very high accuracy when fine-tuned, and allows extraction of related parts for question-answering.

BERT 102 includes a plurality of BERT transformer layers 602, 604, . . . , 606 having the same structure and connected in series. Each of these layers has the same structure as the encoder block of a transformer as does KI transformer layer 130, and almost identical to KI transformer layer 130 except for a very small part. Here, in order to distinguish from KI transformer layers, these layers are referred to as BERT transformer layers.

BERT transformer layer 602 receives an input word-embedding vector sequence 600 as an input, BERT transformer layer 604 receives an output of BERT transformer layer 602 as an input, and thereafter the same process continues. A word sequence 608 output from the last BERT transformer layer 606 will be the input to KI transformer 104. FIG. 10 shows input word-embedding vector sequence 600 given collectively to BERT 102. Actually, however, input word-embedding vectors forming the input word-embedding vector sequence 600 are successively input to BERT 102 one by one, and the word sequence 608 is also output successively.

While the plurality of BERT transformer layers 602, 604, . . . , 606 have the same structures, their parameters differ from each other because of pre-training and fine-tuning of BERT 102. The input and output to/from each sub-network is a vector of a constant length, for example, a vector of 512 dimensions. The length of the vector is selected to be larger than the number of words of the longest input sentence to be processed.

In the following description, it is assumed that BERT 102 has been pre-trained in Japanese. The text classifier 90 for answer identification shown in FIG. 4 forms one neural network as a whole. In the fine-tuning of text classifier 90 for answer identification as a whole, training data in which a pair of question-and-answer candidate passage, a label indicating whether or not the answer candidate passage includes an answer to the question and a label indicating start and end positions of the answer part, prepared manually in advance as a set is used to train BERT 102, KI transformer 104 and an updating unit of BKRG 114, by common error back-propagation. Prior to the fine-tuning, BKRG layers 150, 154, . . . , 158 and so forth are trained, and during the fine-tuning, parameter values of BKRG layers 150, 154, . . . , 158 and so forth are fixed.

<<Transformer Structure>>

Figure 11:
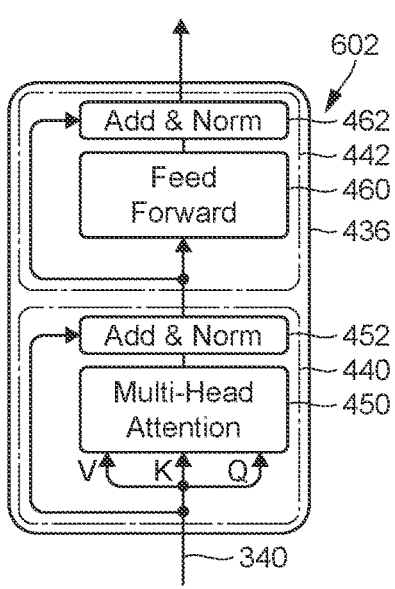
FIG. 11 is a block diagram schematically showing a BERT transformer layer.

BERT 102 and KI transformer 104 shown in FIG. 4 use, as a basic block, an encoder block of a high-performance neural network referred to as a Transformer, often used as a language model of a natural language (KI transformer layers 130, 132, . . . , 134 of FIG. 4 and BERT transformer layers 602, 604, . . . , 606 of FIG. 10). FIG. 11 schematically shows a structure of the BERT transformer layer and FIG. 12 schematically shows a structure of the KI transformer layer.

Figure 12:
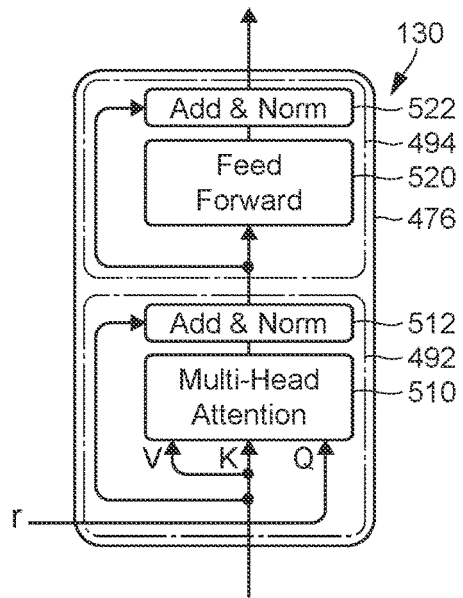
FIG. 12 is a block diagram schematically showing a configuration of knowledge integration transformer layer.

Referring to FIGS. 11 and 12, the BERT transformer and the KI transformer are substantially identical, except for only a small part.

Though not shown, by way of example, at the stage of BERT 102, includes: a word converting unit for converting each word in an input sentence to a word-embedding vector having numerical values as elements, and thereby converting the input sentence to a word-embedding vector sequence; and a position encoder for encoding, for each word-embedding vector in the word-embedding vector sequence output from the word converting unit, position information indicating the position of the corresponding word in the input sentence. By encoding the position information, it becomes possible for the transformer to encode a word sequence by utilizing the order of the input word sequence without necessitating RNN (recurrent Neural Network) or CNN.

The output of BERT transformer layer 602 will be the input to BERT transformer layer 604, and this continues in turn. BERT 102 and KI transformer 104 are connected such that the output of the last BERT transformer layer 606 of BERT 102 becomes the input of KI transformer layer 130 of KI transformer 104. Though not shown in FIG. 4, at the output stage of KI transformer 104, a linear transformation sub-network and a SoftMax layer are provided in this order. The SoftMax layer provides the probability of each output word.

BERT transformer layer 602 receives an input 340, which is a word-embedding vector sequence, and encodes input 340 into a vector representation with self-attention. The word-embedding vector sequence includes a plurality of word-embedding vectors having the same structure connected to each other and, from a different viewpoint, it may be considered to be a word-embedding vector matrix. In a transformer, an operation between matrixes consisting of vector sequences obtained from a plurality of words plays an important role. Self-attention refers to an attention for the input 340 by the same input 340, and the self-attention to a specific word in input 340 is calculated by using attentions from all other words in input 340.

As shown in FIG. 11, BERT transformer layer 602 includes an encoder sub-network 436 of two-layered structure. Encoder sub-network 436 includes a first layer sub-network 440 for receiving input 340, and a second layer sub-network 442 for receiving the output of the first layer sub-network 440 and generating the output of BERT transformer layer 602.

The first layer sub-network 440 includes: a multi-head attention sub-network 450 that receives word-embedding vector sequence 340, calculates, using the word-embedding vector sequence 340, for each input word-embedding vector, self-attention related to the corresponding word, and outputs an attention vector sequence consisting of these attentions; and an ADD & Norm sub-network 452 that adds to each attention vector in the attention vector sequence output from multi-head attention sub-network 450, the corresponding word-embedding vector in the word-embedding vector sequence as the input to multi-head attention sub-network 450, and thereafter performs layer normalization. Multi-head attention sub-network 450 uses a matrix formed of the word-embedding vector sequence as the input to BERT transformer layer 602 branched into three. These three inputs are referred to as V (value), K (key) and Q (Query) from the left side of FIG. 11. Details of multi-head attention sub-network 450 will be described later with reference to FIG. 13.

The second layer sub-network 442 includes: a fully-connected sub-network 460 including a fully-connected feed-forward network provided corresponding to each word position, output from Add & Norm sub-network 452; and an ADD & Norm sub-network 462 for performing the same process as that of ADD & Norm sub-network 452 on the output of fully-connected sub-network 460. The output of ADD & Norm sub-network 462 is a word-embedding vector sequence of the same length as the input to BERT transformer layer 602.

As described above, the word-embedding vector sequence can be regarded as a matrix having the word-embedding vectors as rows. Therefore, practically, each operation in BERT transformer layer 602 is executed as a matrix operation.

KI transformer layer 130 shown in FIG. 12 has the same structure as BERT transformer layer 602 and the like. It is different, however, in that in BERT transformer layer 602 and the like, a matrix Q obtained by branching the input of preceding stage is used, while in KI transformer layer 130, the background knowledge representation vector r output from the corresponding (same) layer of BKRG layer (for example, BKRG layer 150 shown in FIG. 1) as the KI transformer layer 130 is used. V and K obtained by branching the output of the preceding stage are used as in the case of BERT transformer layer 602.

Specifically, referring to FIG. 12, KI transformer layer 130 includes an encoder sub-network 476 having a two-layered structure. Similar to the encoder sub-network 436 of BERT transformer layer 602, encoder sub-network 476 includes a first layer sub-network 492 and a second layer sub-network 494.

The first layer sub-network 492 includes: a multi-head attention sub-network 510 that successively receives a word-embedding vector sequences from the preceding stage (in the case of KI transformer layer 130, the output of BERT 102), and using these word-embedding vector sequences, for each input word-embedding vector, calculates an attention using background knowledge representation vector related to the corresponding word, and outputs an attention vector sequence consisting of these attentions; and an ADD & Norm sub-network 512 that adds, to each attention vector in the attention vector sequence output from multi-head attention sub-network 510, the corresponding word-embedding vector in the word-embedding vector sequence as the input to multi-head attention sub-network 510 and, thereafter, performs layer normalization. Different from BERT transformer layer 602, multi-head attention sub-network 510 uses the matrix as an input from the preceding stage branched to V and K. On the other hand, Q input to multi-head attention sub-network 510 is $r_1$ given from the BKRG layer 150 (FIG. 4) of the same layer. Here, it is noted that Q is a matrix (vector sequence) while $r_1$ is a vector. Therefore, in this form, a desired operation cannot be executed. Thus, in the present embodiment, vector $r_1$ or the like is converted to a matrix of the same form as Q.

The second layer sub-network 494 includes: a fully-connected sub-network 520 including fully-connected feed-forward network provided corresponding to each word position output from ADD & Norm sub-network 512; and an ADD & Norm sub-network 522 performing the same process as ADD & Norm sub-network 462 on the outputs of fully-connected sub-network 520. The output from ADD & Norm sub-network 522 is a word-embedding vector sequence of the same length as the input to BERT transformer layer 602, and it will be the input to KI transformer layer 132 (see FIG. 4).

Figure 13:
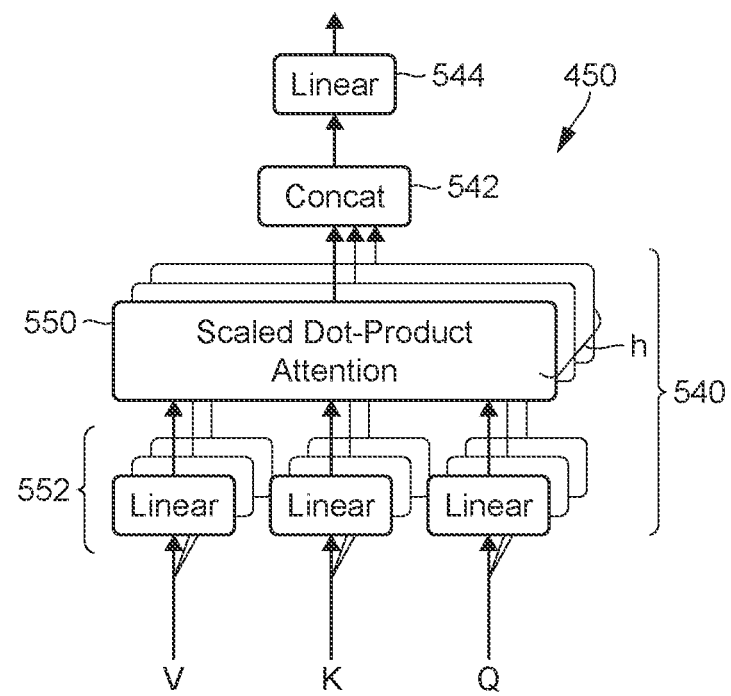
FIG. 13 is a block diagram showing a schematic configuration of a multi-head attention portion of the BERT transformer layer shown in FIG. 10.

FIG. 13 shows a schematic structure of multi-head attention sub-network 450 shown in FIG. 11 in a general transformer. Multi-head attention sub-network 510 shown in FIG. 12 also has a similar structure, except that vector r is used in place of matrix Q and that computational processing of Equations 2 and 3 are different.

Referring to FIG. 13, multi-head attention sub-network 450 includes: a header unit 540 including a plurality of portions referred to as headers; a vector concatenating unit 542 for concatenating vectors output respectively from the plurality of headers of header unit 540; and a linear transformation sub-network 544 for performing linear transformation on an output from vector concatenating unit 542.

Header unit 540 includes: a plurality of (h) headers 550; and three linear transformation sub-networks 552 receiving three inputs obtained by branching a vector sequence as an input from a lower layer to each header 550, for performing linear transformation thereon by using a matrix of which element values are learned beforehand, and thereby generating three matrixes V, K and Q and applying them to each of the h headers of header 550. In KI transformer layer 130 and the like shown in FIG. 12, the background knowledge representation vector r converted to a matrix is used in place of Q.

Figure 14:
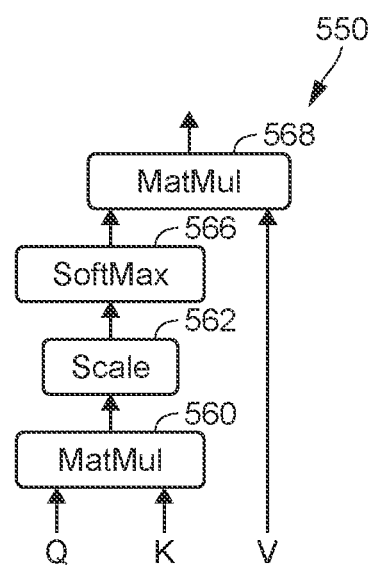
FIG. 14 is a block diagram showing a configuration of one of the heads shown in FIG. 13.

Referring to FIG. 14, header 550 includes: a matrix product sub-network 560 performing multiplication between matrixes Q and K; and a divider circuit 562 for dividing the matrix obtained from matrix product sub-network 560 by a prescribed constant. Header 550 further includes: a SoftMax layer 566 performing SoftMax transformation on the matrix scaled by divider circuit 562; and a matrix product sub-network 568 for performing multiplication between the matrix softmaxed by SoftMax layer 566 and the matrix V after linear transformation.

The transformation described above is done in the form of vector and matrix operations, represented by the following equation. Here, $d_k$ is the square root of the number of rows of linear-transformed matrix K. If the number of rows of matrix K is 64, $d_k$=8.

$$\text{Attention}(Q, K, V) = \text{softmax}\left(\frac{QK^\top}{\sqrt{d_k}}\right)V. \qquad \text{[Equation 2]}$$

The matrixes obtained from matrix product sub-networks 568 of h headers 550 are concatenated by vector concatenating unit 542. While h headers 550 have the same structure, each of these is initialized at random at the time of training. Therefore, after training, the headers come to have parameters different from each other, and thus, h headers 550 provide different results.

Multi-head attention sub-network 510 of KI transformer layer 130 and the like shown in FIG. 12 performs the operation above with the vector r converted to the matrix in the same form as Q, in accordance with the equation below.

$$\text{Attention}(r, K, V) = \left\{\left(\text{softmax}\left(\frac{rK^\top}{\sqrt{d_k}}\right)\right)^\top J_{1,d_k}\right\} \odot V \qquad \text{[Equation 3]}$$

$J_{1,dk}$ is a $d_k$-dimensional all-ones vector and the sign immediately preceding V represents element-by-element multiplication of the matrix (Hadamard product). The Soft-Max operation indicates how much the corresponding tokens should be highlighted, with the value transformed such that the total attains to 1. r must be $d_k$-dimensional, but the output vector rBKRG of actual BKRGs may not be dk-dimensional. In that case, the vector rm(RG is converted to a $d_k$-dimensional vector r in accordance with the following equation.

$$r = Wr_{BKRG} + b \qquad \text{[Equation 4]}$$

where W and b are a trainable matrix and a trainable vector, respectively.

It is noted that there are two types of BERT, that is, a basic version BERT$_{BASE}$ and a larger version BERT$_{LARGE}$. Where L represents the number of layers, A the number of headers and H the number of hidden units in the feed-forward network, in BERT$_{LARGE}$, L=24, H=1024, A=16 and in BERTBAsE, L=12, H=768 and A=12. In the present embodiment and in the experiments described later, we use BERT$_{LARGE}$ as BERT 102.

<<Updating Unit>>

Updating units 152, 156, . . . , and do forth shown in FIG. 4 are part of the overall neural network and have the same structure with each other. By way of example, updating unit 152 receives a word-embedding vector sequence ($q^1$, $p^1$) of the input question and the passage. The word-embedding vector sequence is obtained by performing pre-trained word-embedding on each word of the question and the passage, and thereafter by concatenating the resulting vectors. In response to this vector sequence ($q^1$, $p^1$), BKRG layer 150 processes this and generates background knowledge vector $r_1$ related to the question $q^1$, which vector is input to KI transformer layer 130. Using relevance between the background knowledge vector $r_1$ and the vector sequence ($q^1$, $p^1$) as the input to BKRG layer 150, updating unit 152 updates the vector sequence ($q^1$, $p^1$) and generates a vector sequence ($q^2$, $p^2$), which is input to the next BKRG layer, that is, BKRG layer 154, as well as to updating unit 156. In response to this vector sequence ($q^2$, $p^2$), BKRG layer 154 processes this and generates a new background knowledge vector $r^2$, which is input to KI transformer layer 132. Using relevance between the background knowledge vector $r^2$ and the vector sequence ($q^2$, $p^2$), updating unit 156 updates the vector sequence ($q^2$, $p^2$) and generates a vector sequence ($q^3$, $p^3$) to be input to the next BKRG layer. Then, similar process continues.

When we generally represent the j-th word-embedding vector of the j-th word of a vector sequence $q^i$ or $p^i$ as $x_j^i$ (x=q or p), a relevance-weighted word-embedding vector $\bar{x}_j^i$ is obtained by computing relevance of the word to the background vector $r_i$ calculated in the i-th BKRG layer.

$$\bar{x}_j^i = \text{soft max}_j(x^{iT}M^{u}R^{i}x_j^{i}), \qquad \text{[Equation 5]}$$

where M$\in \mathbb{R}^{d_1 \times d_2}$ is a trainable matrix and softmax$_j$(v) denotes the j-th element of the softmaxed vector.

As a result, a vector sequence $x^i$ (weighted vector sequence $q^i$ or $p^i$), with each vector weighted by the relevance with the background knowledge vector $r_i$ is obtained. $x^{i+1}$ ($x^{i+1}$ is either $q^{i+1}$ or $p^{i+1}$) is computed as follows in a highway network style (Reference 3).

$$x^{i+1} = H(\bar{x}^i) \odot T(x^i) + x^i \odot (1 - T(x^i)), \qquad \text{[Equation 6]}$$

where H($x^i$)−W$_h^i$$x^i$+b$_h^i$, T($x^i$)=σ(W$_t^i$$x^i$+b$_t^i$), σ is the sigmoid function, ⊙ represents the element-wise product, and W$_h^i$, W$_t^i$, b$_h^i$, and b$_t^i$ are layer-specific paameter to be arned.

The vector sequence ($q^{i+1}$, $p^{iївна}$) updated in this manner will be the input of i+1-th BKRG layer.

Operation

The text classifier 90 for answer identification of which configuration has been described above operates in the following manner. In the following description, it is assumed that BERT 102 is pre-trained in Japanese. Further, the text classifier 90 for answer identification shown in FIG. 4 as a whole is fine-tuned by common error back-propagation, using manually prepared training data including sets of a pair of question and passage, a label indicating whether or not the passage includes an answer to the question, and a label indicating start and end positions of the answer portion. Prior to the fine-tuning, BKRG layers 150, 154, . . . , 158 and so on are trained and during the fine-tuning, parameter values of BKRG layers 150, 154, . . . , 158 are fixed.

<<Training of Fake Representation Generator 200>>

First, training of fake representation generator 200 shown in FIG. 5 will be described with reference to FIG. 8. Fake representation generator 200 is trained by GAN together with real representation generator 194 and discriminator 204 shown in FIG. 5. Prior to this training, by causal relation extracting unit 270 and tool-goal relation extracting unit 280 shown in FIG. 7, texts representing causal relations and tool-goal relations are collected from the Internet 250 and stored respectively in causal relation storage device 272 and tool-goal relation storage device 282. From the causal relation texts and the tool-goal relation texts stored in causal relation storage device 272 and tool-goal relation storage device 282, causal relation training data generating unit 274 and tool-goal relation training data generating unit 284 respectively generate causal relation training data and tool-goal relation training data, which are stored in causal relation training data storage device 276 and tool-goal relation training data storage device 286, respectively.

Causal relation BKRG training unit 278 trains causal relation BKRG 256 using the causal relation training data stored in causal relation training data storage device 276, and tool-goal relation BKRG training unit 288 trains tool-goal relation BKRG 258 using the tool-goal training data stored in tool-goal relation training data storage device 286.

Training of causal relation BKRG 256 and training of tool-goal relation BKRG 258 are the same in procedure while the training data is different. Therefore, here, operation of GAN 180 related only to the training of causal relation BKRG 256 will be described.

Referring to FIG. 8, in this training, a computer is connected to causal relation training data storage device 276. Specifically, the computer opens a file including the causal relation training data in causal relation training data storage device 276 realized by an external storage device, reads contents thereof and stores them in a memory. Alternatively, the computer reads the causal relation training data from database storing these, and stores them in a memory (step 300).

Thereafter, adversarial training is performed between the real representation generator 194 and discriminator 204 and fake representation generator 200 (step 304).

Referring to FIG. 9, in the adversarial training at step 304, a plurality of sets of question 190 and background knowledge 192 for the question are sampled from the training data (step 320). Thereafter, parameters of fake representation generator 200 are fixed (step 322). Using the sampled question 190 and the background knowledge 192 for the question 190, real representation generator 194 generates real representation 196 and applies it to discriminator 204. On the other hand, fake representation generator 200 generates fake representation 202 using the same question 190 and noise generated at random, and applies it to discriminator 204. Discriminator 204 determines whether real representation 196 and fake representation 202 are real or not. Using the results of determination on the sampled training data as a whole, at step 324, the parameters of discriminator 204 and real representation generator 194 are trained by error back propagation while the parameters of fake representation generator 200 are fixed, such that erroneous determination of the data by discriminator 204 is minimized, that is, the probability of erroneously determining real representation 196 as fake and fake representation 202 as real is made smaller.

Thereafter, parameters of discriminator 204 and real representation generator 194 are fixed (step 326). While the parameters of discriminator 204 are fixed, fake representation generator 200 is trained, using the question 190 and noise 198 generated at random (step 328). Specifically, fake representation generator 200 generates fake representation 202. Discriminator 204 determines whether or not the fake representation 202 is real. The determination is done on a plurality of questions 190 and the parameters of fake representation generator 200 are adjusted while the parameters of discriminator 204 and real representation generator 194 are fixed, such that the erroneous determination by discriminator 204 is maximized, that is, the probability that discriminator 204 determines fake representation 202 to be real becomes larger.

By repeating such a process, the real and fake representations by real representation generator 194, discriminator 204 and fake representation generator 200 eventually come to reach Nash equilibrium in game theory, and the determination results by discriminator 204 reaches the state of 50% correct and 50% erroneous determinations, or to a constant state near Nash equilibrium.

Referring to FIG. 8, at step 306, whether the accuracy of determination by discriminator 204 has reached the state of Nash equilibrium or a constant state near Nash equilibrium is determined. If the result of determination is negative, the control returns to step 304, and adversarial training of real representation generator 194, fake representation generator 200 and discriminator 204 is continued. If the determination at step 306 is in the positive, the parameters of fake representation generator 200 are stored in the storage device at step 308, and the process ends. By the parameters of fake representation generator 200 and the program realizing the network configuration of fake representation generator 200, the causal relation BKRG 256 of the present invention is realized.

By executing the adversarial training using tool-goal relation training data storage device 286 shown in FIG. 7 on another set of real representation generator 194, fake representation generator 200 and discriminator 204, tool-goal relation BKRG 258 can be obtained in the similar manner. The BKRG layers 150, 154, 158 and so on shown in FIG. 4 are all obtained by concatenating causal relation BKRG 256 and tool-goal relation BKRG 258, and the outputs of these two are concatenated and output, as vector $r^1$ from BKRG layer 150, for example.

<<Training of BERT 102>>

Pre-training of BERT 102 is well known and, therefore, details thereof will not be repeated here. In short, a large number of sentences for pre-training are prepared in advance, and among these sentences, any one with a word deleted is used as an input and BERT 102 is pre-trained to predict the deleted word. By this method, it becomes unnecessary to process data for preparing the training data.

Pre-training of BERT 102 and fine-tuning of text classifier 90 for answer identification are performed as described above. Therefore, details thereof will not be repeated here. In the fine-tuning, common error back-propagation can be used, paying attention that the parameters of BKRG layers 150, 154, ..., 158 are kept fixed.

<<Operation of Text Classifier 90 for Answer Identification During Testing>>

Referring to FIG. 4, when text classifier 90 for answer identification is tested, a question and a passage as an object of determination as to whether it includes an answer to the question are applied as input 100 to BERT 102 and vector converter 112.

BERT 102 processes input 100 in accordance with the trained parameters and applies an output to KI transformer layer 130.

In parallel, vector converter 112 converts the question and the passage included in input 100 to word-embedding vector sequences respectively and concatenates these, and applies the result to BKRG layer 150 and to updating unit 152. Of the word-embedding vector sequences, BKRG layer 150 processes the word-embedding word vector sequence $q^1$ of the question as a question and the word-embedding vector sequence $p^1$ of the passage as noise 198 shown in FIG. 5, and thereby generates a vector $r^1$ for the question and applies it to KI transformer layer 130.

KI transformer layer 130 operates on the output of BERT 102 using the vector $r^1$ applied from BKRG layer 150 as an attention (matrix Q) and applies the result to KI transformer layer 132. Here, vector $r^1$ is used for KI transformer layer 130 to carefully read a portion that might be an answer while analyzing the object passage.

On the other hand, in BKRG 114, updating unit 152 updates the word-embedding vector sequence $(q^1, p^1)$ output from vector converter 112 to word-embedding vector sequence $(q^2, p^2)$ using the vector $r^1$ output from BKRG layer 150 in accordance with the above-described equation, and applies it to BKRG layer 154 and to updating unit 156.

Regarding word-embedding vector sequence $(q^2, p^2)$, BKRG layer 154 processes $q^2$ as a question and $p^2$ as noise 198 of FIG. 5, thereby generates a vector $r^2$ for the question and applies it to KI transformer layer 132.

KI transformer layer 132 operates on the output of KI transformer layer 130 using the vector $r^2$ applied from BKRG layer 154 as an attention (matrixes V and K) as does KI transformer layer 130, and applies the result to the succeeding KI transformer layer. Here, vector $r^2$ is used for KI transformer layer 132 to carefully read a portion that might be an answer while analyzing the object passage.

Thereafter, the same process continues, and a vector $r^N$ is given from BKRG layer 158 to KI transformer layer 134. KI transformer layer 134 operates on the output of preceding KI transformer layer using vector $r^N$ as an attention, and provides the result as output 106. At the head portion of output 106 which corresponds to the token "CLS," a label is output, which label indicates whether or not the passage forming input 100 includes an answer to the question forming input 100, and at portions corresponding to words of the passage in output 106, the start and end positions of a word sequence to be the answer are indicated respectively as probabilities.

In the example shown in FIG. 4, text classifier 90 for answer identification for finding the label and the start and end positions of the answer is described as a unit. The present invention, however, is not limited to such an embodiment and, theses may be prepared and used as separate ones.

Experimental Results

Using the text classifier 90 for answer identification described above, experiments to discriminate whether or not a passage given to a question in Japanese includes a correct answer (answer identifying experiments) were conducted. The experiments involved both tasks of why-type questions and how-type questions.

As the training data for adversarial training of fake representation generator 200 of FIG. 5 (BKRG layers 150, 154, . . . , 158 of FIG. 4), causal relation data (obtained by the method described in Reference 4 listed below) and tool-goal relation data (obtained by the method described in Reference 5 listed below) were used. The causal relation data includes approximately 100 million causal relation data items automatically obtained from 4 billion web texts. In the experiments, 1,000,000 data items sampled at random from the causal relation data were used. Similarly, the tool-goal data includes about 120 million tool-goal relation data items automatically obtained from 4 billion web texts. In the experiments, 1,000,000 data items sampled at random from above were used.

Each of the why-question-answering data items and how-question-answering data items obtained in this manner was divided into training data, development data and evaluation (test) data for the experiments. Statistics of the classified data are as shown in FIGS. 15 and 16.

As described above, BERTLARGE was used as BERT 102, whose number of layers was L=24, the header number A of transformer encoder was A=16, and the number of hidden units H of feed forward network was H=1,024. For the training, 2.2 billion sentences were used. Batch size for the training was 4,096, and the number of steps for the training was 1,100,000.

In the experiments, the causal relation BKRG and tool-goal relation BKRG trained in accordance with the method of the embodiment above were used.

FIG. 17 shows the results in a form of a table. In FIG. 17, the results 636 on the fourth row indicated by "Proposed" are the results of the system of the embodiment above. In FIG. 17, "P@1(Precision at top answer)" indicates the highest precision of the results, ranked question by question. "MAP (Mean Average Precision)" indicates a mean value of average precision of the results ranked question by question.

The results 630 of the results rows indicate the results attained by the method (CNN and Answer Representation Generator (ARG)) described in Reference 6 listed below. Results 632 show results when BERT only was used. Results 634 are results when Representation output from the BKRG in accordance with the embodiment above was added as an input to the last SoftMax layer in the method using BERT of results 632.

In contrast, results 638 and below of the result rows are attained by removing some elements from the method of the above-described embodiment, of which results are indicated by 636. Results 638 were attained by removing updating of the question-passage pairs by updating units 152, 156 and the like shown in FIG. 4. Results 640 were attained by removing causal relation BKRG from the method of the embodiment. Results 642 were attained by removing the tool-goal relation BKRG.

When we compare the first, third and fourth result rows of FIG. 17, it can be seen that the fourth row provides the highest precision. Specifically, it can be seen that using the background knowledge representation vector from the BKRG, and by integrating the background knowledge representation vector with BERT results by the KI transformer, higher precision than the basic method indicated by the first row and higher than the method using BERT only (second row), and still higher than the method of BERT+BKRG could be attained.

Further, the performance indicated by results 636 is higher than any of results 638, 640 and 642. Therefore, it is understood that the method of updating the input question and passage by updating unit 152 and BKRG layer 154 shown in FIG. 4, and the method not using the causal relation or tool-goal relation in BKRG layers 150, 154, . . . , 158 and the like, both contribute to the improved performance of the embodiment above as indicated by results 636.

Second Embodiment

Configuration

The text classifier 90 for answer identification of the first embodiment above applies the present invention to why-questions and how-questions in Japanese. The present invention, however, is applicable not only to Japanese but also to other languages, for example, to English. Further, it is also applicable to an open-domain question-answering system, rather than a specific domain. The second embodiment is directed to a question-answering system executing an open-domain question-answering task in English.

The task is to receive a question, to select a passage having high possibility of including an answer to the question, and to extract an answer from the passage. Main question type is factoid-question. Answers often consist of a word/noun phrase. Answers to factoid-question tend to be shorter than answers to why-type and how-type questions.

Figures 18, 19:
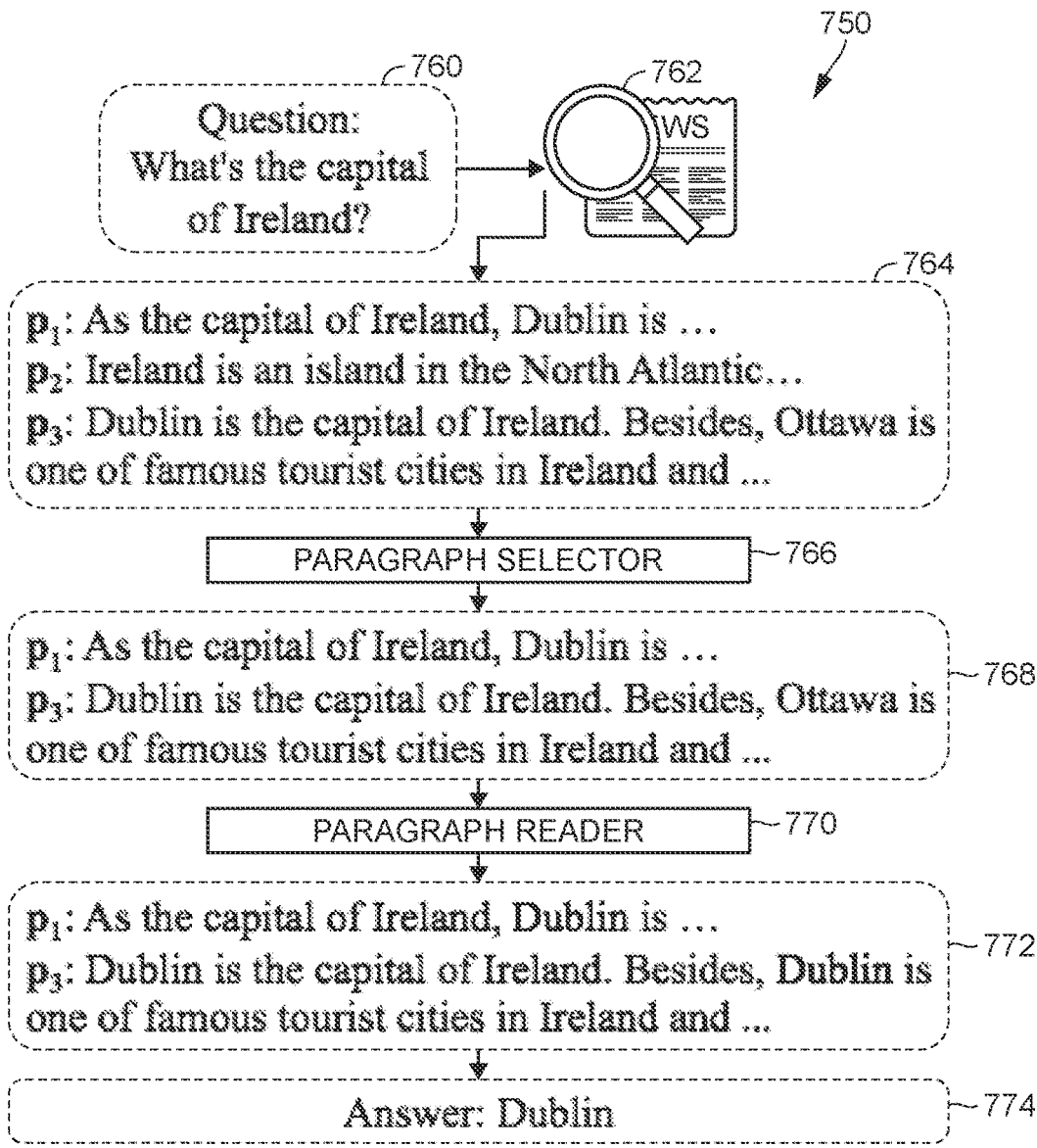
FIG. 18 is a schematic illustration showing the process of question-answering system in accordance with a second embodiment of the present invention.
FIG. 19 shows, in the form of a table, statistics of experimental data for testing the question-answering system in accordance with the second embodiment.

A question-answering system for English has a task called Distantly supervised open-domain QA (DS-QA), which is described in References 7 and 11 below. Referring to FIG. 18, the task 750 is to receive a question 760, to search 762 for a plurality of passages 764 and to extract an answer 774 from the passages 764. More specifically, the question-answering system for this task 750 involves a paragraph selector 766 selecting a set 768 of paragraphs having high probability of containing an answer from the passages, and a paragraph reader 770 calculating a set 772 of answer candidates formed of word sequences having the highest probability to be an answer to question 760, when the set 768 of paragraphs selected by paragraph selector 766 and question 760 are applied. From the set 772 of answer candidates, an answer 774 is extracted.

An exemplary question-answering system executing the task 750 described in References 7 and 11 includes retrieval 762 responsive to a question 760 for searching for and retrieving a passage 764 possibly including answer candidates from a text archive. The passage 764 is defined by $P=\{p_1, \ldots, p_N\}$, where $p_1, \ldots, p_N$ each represents a paragraph (N=positive integer). Task 750 further includes a paragraph selector 766 selecting, from each of the paragraphs $p_1, \ldots, p_N$ included in the passage 764, a paragraph having high possibility of being a correct answer and generating a set 768 of paragraphs; a paragraph reader 770 extracting, from each of the paragraphs in the set 768 of paragraphs, portions supposed to be answers and generating a set 772 of answer candidates; and the set 772 of answer candidates outputting, as an answer 774, the answer candidate having the highest probability of being a correct answer to question 760 from the set 772 of answer candidates.

In the present embodiment, when $P=\{p_i\}$ is given as passage 764 to a question q, the score Score(a|q, P) of each answer a in the set 772 of answer candidates is defined as follows, where ap indicates a paragraph including an answer.

$$\text{Score}(a \mid q, P) = \sum_i Pr(a \mid q, p_i) Pr(ap \mid q, p_i) \quad \text{[Equation 7]}$$

The second term following the sigma sign corresponds to the paragraph selector 766, and it indicates the probability that the paragraph $p_i$ includes an answer to the question q. The first term corresponds to the paragraph reader 770, and it indicates the probability that an answer a to the question q is extracted from paragraph $p_i$.

In the present embodiment, components described in the first embodiment can be used as paragraph selector 766 and paragraph reader 770. A paragraph selector 766 is used that has the same structure as that described in the first embodiment and is trained by the training data having a value added as a label to each pair of question and paragraph indicating whether or not the paragraph includes an answer to the question. As paragraph reader 770, two text classifiers 90 for answer identification trained respectively by using the training data having an answer start position as a label and the training data having an answer end position as a label for each pair of a question and a paragraph including a correct answer to the question, may be used.

Effects

In order to evaluate the performance of task 750 in accordance with the second embodiment, the following experiments were conducted. FIG. 19 shows statistics of the training/evaluation data used in the experiments.

In the experiments, for comparison, three datasets (Quasar-T (Reference 8), SearchQA (Reference 9) and TriviaQA (Reference 10) were used, and three known methods, that is, OpenQA (Reference 11), TriviaQA (Reference 10) and MBERT (Multi-passage BERT) (Reference 12) were compared with the method (Proposed) in accordance with the second embodiment above. Experimental results are as shown in FIG. 20.

Referring to FIG. 20, results 800, 802 and 804 represent results of the conventional systems. Results 800 represents results attained by the system based on LSTM (Long Short-Term Memory) according to Reference 11. Results 802 are attained by combining the system of Reference 11 and ARG proposed in Reference 6, which is also based on LSTM. Results 804 are attained by MBERT, which is conventionally believed to have the highest performance.

In contrast, results 806 represent results attained by the paragraph selector 766 and the paragraph reader 770 in accordance with the second embodiment above. Results 808 are attained when BKRG was not used in the second embodiment. Results 810 are obtained when BKRG was used but the question/passage pairs were not updated. Results 812 are attained when the SQuAD data described in Reference 13 was added to the training data to train the paragraph selector 766 and the paragraph reader 770 shown in FIG. 18. It is noted that for results 812, BKRG was not used.

For all evaluations, EM score and F1 score were used. EM represents the ratio of prediction results that accurately agree with any ground truth. F1 roughly represents average overlap between the predicted results and the ground truth.

From these results, it can be seen that when the paragraph selector 766 and the paragraph reader 770 in accordance with the second embodiment above are used, performance is better than any other conventional methods over all data sets. Particularly, the second embodiment considerably outperformed the MBERT, which attains the highest performance among the conventional techniques. Further, both results 808 and 810 show better performance than any of the conventional techniques, though not higher than results 806, and it is understood that using BKRG and updating the question/passage pairs as inputs to the BKRG both contribute to improved performance of the second embodiment.

From the experimental results of the first and second embodiments above, it is understood that the background knowledge representation generator in accordance with the present invention exhibits higher performance on different tasks in different languages over the conventional art, and is effective in the question-answering system.

In the embodiments above, BERT is used as the language representation model to be used for the text classifier for answer identification. The model, however, is not limited to BERT. By way of example, a language representation model formed based on a transformer encoder block or similar type of networks such as XLNet (Reference 14), RoBERTa (Reference 15), ALBERT (Reference 16) and StructBERT (Reference 17) may be used.

Computer Implementation

Figure 21:
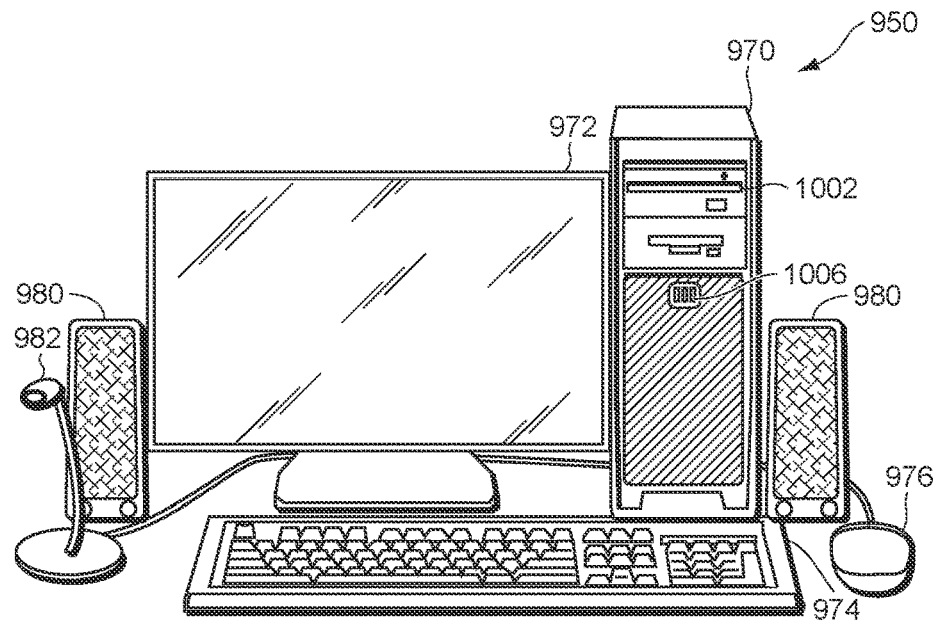
FIG. 21 shows an appearance of the computer system realizing the embodiments of the present invention.
Figure 22:
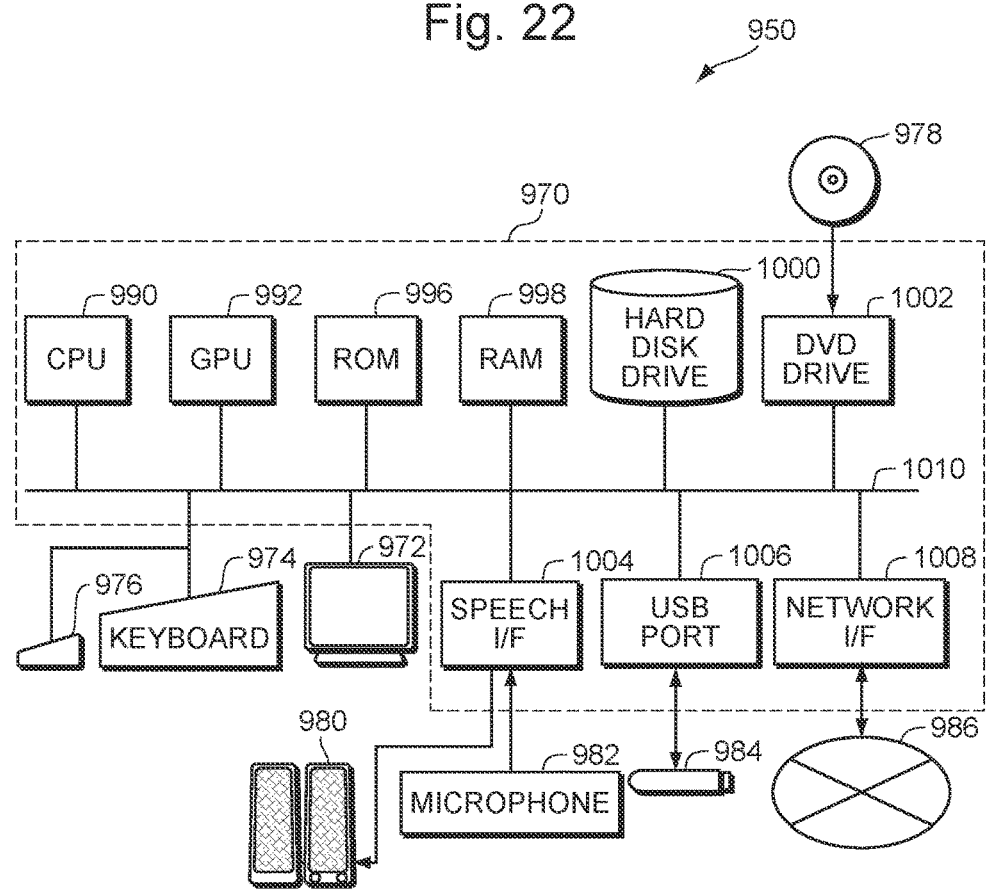
FIG. 22 is a block diagram showing a hardware configuration of the computer system of which appearance is shown in FIG. 21.

FIG. 21 shows an appearance of a computer system realizing each of the above-described embodiments. FIG. 22 is a hardware block diagram of the computer system shown in FIG. 21.

Referring to FIG. 21, the computer system 950 includes: a computer 970 having a DVD (Digital Versatile Disc) drive 1002; and a keyboard 974, a mouse 976 and a monitor 972, all connected to computer 970 for interaction with the user. These are examples of user interaction equipment and any other general hardware and software (for example, a touch-panel, voice input, pointing device and so on) allowing user interaction may be used.

Referring to FIG. 22, in addition to DVD drive 1002, computer 970 includes a CPU (Central Processing Unit) 990, a GPU (Graphics Processing Unit) 992, a bus 1010 connected to CPU 990, GPU 992, and DVD drive 1002, a ROM (Read-Only Memory) 996 connected to bus 1010 for storing a boot up program and the like of computer 970, a RAM (Random Access Memory) 998 connected to bus 1010, for storing instructions forming a program, a system program and work data, and a HDD (Hard Disk Drive) 1000, which is a non-volatile memory connected to bus 1010. HDD 1000 is for storing programs executed by CPU 990 and GPU 992, data used by the programs executed by CPU 990 and GPU 992 and so on. Computer 970 further includes: a network OF 1008 providing connection to a network 986 allowing communication with other terminals; and a USB port 1006 to which a USB memory 984 may be detachably attached, providing communication with USB memory 984 and different units in computer 970.

Computer 970 further includes a speech OF 1004 connected to a microphone 982, a speaker 980 and bus 1010, reading out a speech signal generated by CPU 990 and stored in RAM 998 or HDD 1000 under the control of CPU 990, to convert it into an analog signal, amplify it, and drive speaker 980, or digitizing an analog speech signal from microphone 982 and storing it in addresses in RAM 998 or in HDD 1000 specified by CPU 990.

In the embodiments described above, data and parameters of fake representation generator 200, real representation 196, discriminator 204, question 190, background knowledge 192 and so on show in FIG. 4 are stored, for example, in HDD 1000, RAM 998, DVD 978 or USB memory 984 shown in FIG. 22, or in a storage medium of an external device, not shown, connected through network OF 1008 and network 986. Typically, the data and parameters are written from the outside to HDD 1000, for example, and at the time of execution by computer 970, loaded into RAM 998.

Computer programs causing the computer system to operate to realize functions of GAN 180 shown in FIG. 8, the training device for generative adversarial network therefor, and various components thereof are stored in DVD 978, loaded to DVD drive 1002, and transferred from DVD drive 1002 to HDD 1000. Alternatively, the programs may be stored in the USB memory 984, and the USB memory 984 is attached to USB port 1006, and the programs may be transferred to hard disk 1000. Alternatively, the programs may be transmitted through network 986 to computer 970 and stored in HDD 1000. At the time of execution, the programs will be loaded into RAM 998. Naturally, source programs may be typed using keyboard 974, monitor 972 and mouse 976, and the compiled object programs may be stored in HDD 1000. When a script language is used, scripts input through keyboard 974 or the like may be stored in HDD 1000. For a program operating on a virtual machine, it is necessary to install programs that function as a virtual machine in computer 970 beforehand.

CPU 990 fetches an instruction from RAM 998 at an address indicated by a register therein (not shown) referred to as a program counter, interprets the instruction, reads data necessary to execute the instruction from RAM 998, hard disk 1000 or from other device in accordance with an address specified by the instruction, and executes a process designated by the instruction. CPU 990 stores the resultant data at an address designated by the program, of RAM 998, hard disk 1000, register in CPU 990 and so on. At this time, the value of program counter is also updated by the program. The computer programs may be directly loaded into RAM 998 from DVD 978, USB memory 984 or through the network. Of the programs executed by CPU 990, some tasks (mainly numerical calculation) may be dispatched to GPU 992 by an instruction included in the programs or in accordance with a result of analysis during execution of the instructions by CPU 990.

The programs realizing the functions of various units in accordance with the embodiments above by computer 970 may include a plurality of instructions described and arranged to cause computer 970 to operate to realize these functions. Some of the basic functions necessary to execute the instruction are provided by the operating system (OS) running on computer 970, by third-party programs, or by modules of various tool kits installed in computer 970. Therefore, the programs may not necessarily include all of the functions necessary to realize the system and method in accordance with the present embodiment. The programs have only to include instructions to realize the functions of the above-described various devices or their components by calling appropriate functions or appropriate "program tool kits" in a manner controlled to attain desired results. The operation of computer 970 for this purpose is well known and, therefore, description thereof will not be given here. It is noted that GPU 992 is capable of parallel processing and capable of executing a huge amount of calculation accompanying machine learning simultaneously in parallel or in a pipe-line manner. By way of example, parallel computational element found in the programs during compilation of the programs or parallel computational elements found during execution of the programs may be dispatched as needed from CPU 990 to GPU 992 and executed, and the result is returned to CPU 990 directly or through a prescribed address of RAM 998 and input to a prescribed variable in the program.

[Reference 1]
Jacob Devlin, Ming-Wei Chang, Kenton Lee, and Kristina Toutanova. 2018. BERT: pre-training of deep bidirectional transformers for language understanding. CoRR, abs/1810.04805.

[Reference 2]
Ian J. Goodfellow, Jean Pouget-Abadie, Mehdi Mirza, Bing Xu, David Warde-Farley, Sherjil Ozair, Aaron Courville, and Yoshua Bengio. 2014. Generative adversarial nets. In Proceedings of the 27th International Conference on Neural Information Processing Systems-Volume 2, NIPS'14, pages 2672-2680, Cambridge, MA, USA. MIT Press.

[Reference 3]
Rupesh K Srivastava, Klaus Greff, and Jurgen Schmidhuber. 2015. Training very deep networks. In Advances in Neural Information Processing Systems 28, pages 2377-2385.

[Reference 4]
Jong-Hoon Oh, Kentaro Torisawa, Chikara Hashimoto, Motoki Sano, Stijn De Saeger, and Kiyonori Ohtake. 2013. Why-question answering using intra- and inter-sentential causal relations. In Proceedings of the 51st Annual Meeting of the Association for Computational Linguistics (Volume 1: Long Papers), pages 1733-1743.

[Reference 5]
Kazuma Kadowaki, Ryu Iida, Kentaro Torisawa, Jong-Hoon Oh, and Julien Kloetzer. 2019. Event causality recognition exploiting multiple annotators' judgments and background knowledge. In Proceedings of the 2019 Conference on Empirical Methods in Natural Language Processing and the 9th International Joint Conference on Natural Language Processing (EMNLP-IJCNLP), pages 5816-5822.

[Reference 6]
Jong-Hoon Oh, Kazuma Kadowaki, Julien Kloetzer, Ryu Iida, and Kentaro Torisawa. 2019. Open-domain why-question answering with adversarial learning to encode answer texts. In Proceedings of the 57th Annual Meeting of the Association for Computational Linguistics, pages 4227-4237.

[Reference 7]
Danqi Chen, Adam Fisch, Jason Weston, and Antoine Bordes. 2017. Reading Wikipedia to answer open-domain questions. In Proceedings of the 55th Annual Meeting of the Association for Computational Linguistics (Volume 1: Long Papers), pages 1870-1879.

[Reference 8]
Bhuwan Dhingra, Kathryn Mazaitis, and William W Cohen. 2017. Quasar: Datasets for question answering by search and reading. arXiv preprint arXiv:1707.03904.

[Reference 9]
Matthew Dunn, Levent Sagun, Mike Higgins, V. Ugur Gueney, Volkan Cirik, and Kyunghyun Cho. 2017. Searchqa: A new q & a dataset augmented with context from a search engine. CoRR, abs/1704.05179.

[Reference 10]
Mandar Joshi, Eunsol Choi, Daniel Weld, and Luke Zettlemoyer. 2017. Triviaqa: A large scale distantly supervised challenge dataset for reading comprehension. In Proceedings of the 55th Annual Meeting of the Association for Computational Linguistics, pages 1601-1611.

[Reference 11]
Yankai Lin, Haozhe Ji, Zhiyuan Liu, and Maosong Sun. 2018. Denoising distantly supervised open-domain question answering. In Proceedings of the 56th Annual Meeting of the Association for Computational Linguistics, ACL 2018, pages 1736-1745.

[Reference 12]
Zhiguo Wang, Patrick Ng, Xiaofei Ma, Ramesh Nallapati, and Bing Xiang. 2019. Multi-passage BERT: A globally normalized BERT model for open-domain question answering. In Proceedings of the 2019 Conference on Empirical Methods in Natural Language Processing and the 9th International Joint Conference on Natural Language Processing (EMNLP-IJCNLP), pages 5878-5882. Association for Computational Linguistics.

[Reference 13]
Pranav Rajpurkar, Jian Zhang, Konstantin Lopyrev, and Percy Liang. 2016. Squad: 100,000+ questions for machine comprehension of text. In Proceedings of the 2016 Conference on Empirical Methods in Natural Language Processing, pages 2383-2392.

[Reference 14]
Zhilin Yang, Zihang Dai, Yiming Yang, Jaime Carbonell, Ruslan Salakhutdinov, Quoc V. Le, "XLNet: Generalized Autoregressive Pretraining for Language Understanding", [ONLINE], https://arxiv.org/abs/1906.08237

[Reference 15]
Yinhan Liu, Myle Ott, Naman Goyal, Jingfei Du, Mandar Joshi, Danqi Chen, Omer Levy, Mike Lewis, Luke Zettlemoyer, Veselin Stoyanov, "RoBERTa: A Robustly Optimized BERT Pretraining Approach", [ONLINE], https://arxiv.org/abs/1907.11692

[Reference 16]
Zhenzhong Lan, Mingda Chen, Sebastian Goodman, Kevin Gimpel, Piyush Sharma, Radu Soricut, "ALBERT: A Lite BERT for Self-supervised Learning of Language Representations", [ONLINE], https://arxiv.org/abs/1909.11942

[Reference 17]
Wei Wang, Bin Bi, Ming Yan, Chen Wu, Zuyi Bao, Jiangnan Xia, Liwei Peng, Luo Si, "StructBERT: Incorporating Language Structures into Pre-training for Deep Language Understanding", [ONLINE], https://arxiv.org/abs/1908.04577

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

REFERENCE SIGNS LIST 190, 760 question
52 answer passage
192 background knowledge
72, 74 arrow
90 text classifier for answer identification
100, 340 input
102 BERT
104 KI transformer
106 output
108 label
110 start/end position
112 vector converter
114 BKRG
116 vector group of background knowledge representations
130, 132, 134 KI transformer layer
150, 154, 158 BKRG layer
152, 156 updating unit
180 GAN
194 real representation generator
196 real representation
198 noise
200 fake representation generator
202 fake representation
204 discriminator
220, 224 word-embedding vector converting unit
222 question word-embedding vector sequence
226 noise word-embedding vector sequence
228 attention adding unit
230 attention-added word-embedding vector
232 CNN
240 BKRG training system
250 Internet
252 causal relation BKRG training unit
254 tool-goal relation BKRG training unit
256 causal relation BKRG
258 tool-goal relation BKRG
270 causal relation extracting unit
272 causal relation storage device
274 causal relation training data generating unit
276 causal relation training data storage device
278 causal relation BKRG training unit
280 tool-goal relation extracting unit 282 tool-goal relation storage device
284 tool-goal relation training data generating unit
286 tool-goal relation training data storage device
288 tool-goal relation BKRG training unit
436, 476 encoder sub-network
440, 492 1st layer sub-network
442, 494 2nd layer sub-network
450, 510 multi-head attention sub-network
452, 462, 512, 522 ADD & Norm sub-network
460 fully-connected sub-network
544, 552 linear transformation sub-network
566 SoftMax layer
520 feed-forward sub-network
540 header unit
542 vector concatenating unit
550 header
560, 568 matrix product sub-network
562 divider circuit
600 input word-embedding vector sequence
602, 604, 606 BERT transformer layer
608 word sequence
750 task
762 retrieval
764 passage
766 paragraph selector
768 paragraph set
770 paragraph reader
772 set of answer candidates
774 answer

The invention claimed is:
1. A text classifier for answer identification, comprising:
a processor; and
a non-transitory machine readable medium connected to the processor and storing a computer program thereon that, when executed by the processor, causes the processor to function as:
a language representation model receiving as inputs question text and answer candidate text;
a knowledge integration transformer receiving, as an input, an output of said language representation model; and
a background knowledge representation generator receiving said question text and said answer candidate text as inputs, and outputting a background knowledge representation vector for the question text; wherein
said knowledge integration transformer is configured to receive said background knowledge representation vector as an attention, and outputs a label indicating whether or not said answer candidate text includes an answer to said question text,
said knowledge integration transformer includes a plurality of knowledge integration transformer layers;
said background knowledge representation generator outputs a plurality of said background knowledge representation vectors corresponding to said plurality of knowledge integration transformer layers;
said plurality of knowledge integration transformer layers receive, as information source for said attention, that one of said plurality of background knowledge representation vectors which corresponds to each knowledge integration transformer layer; and
said knowledge integration transformer includes a multi-head attention sub-network configured to receive, as the output of the language representation model, word-embedding vector sequences, and calculates an attention vector sequence using the word-embedding vector sequences and the background knowledge representation vector.

2. The text classifier for answer identification according to claim 1, wherein
said background knowledge representation generator includes
a background knowledge representation generator layer outputting said background knowledge representation vector in response to an input vector representing a question and an answer candidate, and
an updating unit updating the input vector to said background knowledge representation generator layer, by using said background knowledge representation vector output by the background knowledge representation generator layer, to be used as the next input vector to said background knowledge representation generator layer; and
said updating unit updates a preceding input vector to said background knowledge representation generator by utilizing relevance between said preceding input vector and said background knowledge representation vector output by said background knowledge representation generator in response to said preceding input vector.

3. A text classifier for answer identification, comprising:
a processor; and
a non-transitory machine readable medium connected to the processor and storing a computer program thereon that, when executed by the processor, causes the processor to function as:
a language representation model receiving as inputs question text and answer candidate text;
a knowledge integration transformer receiving, as an input, an output of said language representation model; and
a background knowledge representation generator receiving said question text and said answer candidate text as inputs, and outputting a background knowledge representation vector for the question text; wherein
said knowledge integration transformer is configured to receive said background knowledge representation vector as an attention, and outputs a label indicating whether or not said answer candidate text includes an answer to said question text, said knowledge integration transformer includes a multi-head attention sub-network configured to receive, as the output of the language representation model, word-embedding vector sequences, and calculates an attention vector sequence using the word-embedding vector sequences and the background knowledge representation vector,
said background knowledge representation generator includes
a background knowledge representation generator layer outputting said background knowledge representation vector in response to an input vector representing a question and an answer candidate, and
an updating unit updating the input vector to said background knowledge representation generator layer, by using said background knowledge representation vector output by the background knowledge representation generator layer, to be used as the next input vector to said background knowledge representation generator layer; and
said updating unit updates a preceding input vector to said background knowledge representation generator by utilizing relevance between said preceding input vector and said background knowledge representation vector output by said background knowledge representation generator in response to said preceding input vector.

4. A training device for training a background knowledge representation generator outputting a background knowledge vector representation for a question represented by question text by using a plurality of training data items, said plurality of training data items including question text and background knowledge text related to the question text;

said training device comprising:

a processor; and a non-transitory machine readable medium connected to the processor and storing a computer program thereon that, when executed by the processor, causes the processor to function as:

a real representation generator formed of a neural network generating, upon reception of said question text and said background knowledge text, a real representation vector in the same form as background knowledge vector representation represented by said background knowledge text;

a fake representation generator formed of a neural network generating, upon reception of said question text and random noise vector representing vector representation of arbitrary text, a fake representation vector in the same form as said vector representation related to said background knowledge generated from said noise vector;

a discriminator formed of a neural network for discriminating said real representation vector and said fake representation vector; and a Generative Adversarial Network training, through adversarial training, said real representation generator and said discriminator such that discrimination error by said discriminator is minimized and training said fake representation generator such that discrimination error by said discriminator for said fake representation is maximized; wherein said fake representation generator after completion of training by said Generative Adversarial Network is said background knowledge representation generator after training, and an output of said fake representation generator upon reception of an actual question text and noise is a background knowledge representation vector for the actual question text, and said background knowledge representation vector is input to a knowledge integration transformer including a multi-head attention sub-network configured to calculate an attention vector sequence using the background knowledge representation vector and word-embedding vector sequences output from a language representation model.

* * * * *